United States Patent
Chigrinov et al.

(10) Patent No.: US 8,755,022 B2
(45) Date of Patent: Jun. 17, 2014

(54) LIQUID CRYSTAL DISPLAY CELL WITH FAST RESPONSE AND CONTINUOUS GRAY SCALE

(75) Inventors: Vladimir Grigorievich Chigrinov, Hong Kong (HK); Evgeny Pavlovich Pozhidaev, Moscow (RU); Anatoli Alexandrovich Murauski, Minsk (BY); Hoi Sing Kwok, Hong Kong (HK)

(73) Assignee: The Hong Kong University of Science and Technology, Hong Kong (CN)

( * ) Notice: Subject to any disclaimer, the term of this patent is extended or adjusted under 35 U.S.C. 154(b) by 309 days.

(21) Appl. No.: 13/110,680

(22) Filed: May 18, 2011

(65) Prior Publication Data

US 2011/0285928 A1 Nov. 24, 2011

Related U.S. Application Data

(60) Provisional application No. 61/344,070, filed on May 18, 2010.

(51) Int. Cl.
*G02F 1/141* (2006.01)

(52) U.S. Cl.
USPC ........................................... 349/172; 349/85

(58) Field of Classification Search
None
See application file for complete search history.

(56) References Cited

U.S. PATENT DOCUMENTS

| | | | |
|---|---|---|---|
| 5,617,229 A * | 4/1997 | Yamamoto et al. | 349/42 |
| 6,509,887 B1 | 1/2003 | Kondoh et al. | |
| 6,567,065 B1 | 5/2003 | Kondoh et al. | |
| 6,757,035 B2 | 6/2004 | Choi et al. | |
| 7,042,527 B2 | 5/2006 | Imai | |
| 7,486,304 B2 | 2/2009 | Bergquist et al. | |
| 7,505,015 B2 | 3/2009 | Shimada | |

FOREIGN PATENT DOCUMENTS

JP 02232623 A * 9/1990

OTHER PUBLICATIONS

Beresnev et al., "Deformed helix ferroelectric liquid crystal display—a new electrooptic mode in ferroelectric smectic C* liquid crystals," Liquid Crystals, 5 (4): 1171-1177 (1989).
Beresnev et al., "Electro-optical effect in ferroelectric liquid crystal with small helix pitch and high spontaneous polarization," Pis'ma v Z E T F, USSR, 46 (8): 328-330 (1987).

(Continued)

*Primary Examiner* — Thanh-Nhan P Nguyen
(74) *Attorney, Agent, or Firm* — Leydig, Voit & Mayer, Ltd.

(57) ABSTRACT

The invention relates to liquid crystal display cells with fast response and continuous gray scale. The liquid crystal cell is based on a field-sequential color system ("FSC") and comprises a chiral smectic liquid crystal whose helix pitch is less than thickness of liquid crystal layer placed between two polarizers, as well as a source of voltage applied to electrodes of the cell, wherein the amplitude of the applied voltage is less than the critical voltage amplitude of the helix unwinding. The liquid crystal has one steady state corresponding to twisted helix without applied voltage. In this case, the principal optical axis coincides with the helical axes, but deviates from steady state under the action of a driving voltage, providing thereby an electro-optical response of the display which exhibits gray scale in light transmission or reflection that is continuous, hysteretic-free and non-sensitive to the driving voltage polarity, if the steady orientation of the principle axes is parallel or perpendicular to the light polarization plane and the driving voltage frequency is between 10 Hz and 5 kHz. In embodiments with very short helix pitches, the cells may be free from selective reflection and diffraction in the visible spectral range. Different embodiments of the invention may use ferroelectric liquid crystal, ferroelectric liquid crystal, or antiferroelectric liquid crystal.

13 Claims, 22 Drawing Sheets

(56) References Cited

OTHER PUBLICATIONS

Blinov et al., "'Thresholdless' hysteresis-free switching as an apparent phenomenon of surface stabilized ferroelectric liquid crystal cells," Physical Review E, 66 (2): 021701/1-10 (2002).

Fujisawa et al., "V-Shaped E-O Properties of Polymer Stabilized (PSV-) FLCD Free from Conventional Surface Stabilization: Advanced Color Sequential LCDs," IDW'08 Digest, 1563-1566 (2008).

Li et al., "Gray Scale Generation and Stabilization in Ferroelectric Liquid Crystal Display," J. Displ. Techn. 3: 273-279 (2007).

O'Callaghan et al., Bistable FLCOS devices for double-brightness micro-projectors, J. SID, 369-375 (2009).

Panarin et al., "On V-shaped switching in antiferroelectric liquid crystals," Ferroelectrics, 246: 35-42 (2000).

Pozhidaev et al., "Multistable electro-optical modes in ferroelectric liquid crystals," J. SID, 17/1, 53-59 (2009).

Rudquist et al., "The hysteresis behavior of 'Vshaped switching' smectic materials," Ferroelectrics, 246: 21-33 (2000).

Chigrinov et al., in Photoalignment of Liquid Crystalline Materials: Physics and Applications, 143-148 (John Wiley & Sons, Ltd. Chichester, UK, Aug. 2008).

Li et al., "Gray scale generation and stabilization in ferroelectric liquid crystal display," J. Displ. Technol., 3: 273-279 (2007).

Pozhidaev et al., "High frequency and high voltage mode of deformed helix ferroelectric liquid crystals in a broad temperature range," Ferroelectrics, 246 (1-4): 235-245 (2000).

Chigrinov et al., "Liquid crystal switchers for fiber optics," Proc. of Second Asia-Pacific Polymer Fibre Optics Workshop, 149-155 (Jan. 3-4, 2003).

Pozhidaev et al., "Photoalignnnent of ferroelectric liquid crystals by Azodye layers," Japanese Journal of Applied Physics, 43 (8A): 5440-5446 (2004).

Pozhidaev et al., "New chiral dopant possessing high twisting power," Mol. Cryst. Liq. Cryst., 509: 300/[1042]-308 [1050] (2009).

Pozhidaev et al., "Fast photo-aligned V-shape ferroelectric LCD based on DHF mode," 2010 SID International Symposium, Session 27-2 (Seattle, Washington, USA, May 26, 2010).

Pozhidaev et al., "Smectic nanostructures with a typical size less than a visible light wavelength: physics and electro-optics," Photonics Letters of Poland, 3 (1): 11-13 (2011).

\* cited by examiner

1300

LIQUID CRYSTAL DISPLAY CELL WITH FAST RESPONSE AND CONTINUOUS GRAY SCALE

CROSS-REFERENCE TO RELATED APPLICATIONS

This patent application claims the benefit of U.S. Provisional Patent Application No. 61/344,070, filed May 18, 2010, which is incorporated by reference.

BACKGROUND OF THE INVENTION

Liquid crystal display devices (hereinafter abbreviated LCDs) have found widespread commercial applications in a variety of fields ranging from calculators to television sets (hereinafter abbreviated TV's) because of their excellent display performance which rivals that of the cathode ray tube, their thin and light-weight construction, and other useful features such as low power consumption. Various improvements have been made to LCD technology, and LCDs are now the most abundant type of display in use. Among such improvements, improvements in color LCD technology involve various aspects of display performance and have been particularly significant in the development of the technology.

The principle of a color display is based on a method called an "additive color mixing process." When two or more colored light beams enter the human eye, the light beams are combined on the retina and perceived as a color different from the colored light beams. Based on this principle, any color can be obtained by additively mixing light beams of three primary colors, R (red), G (green), and B (blue), in appropriate proportions. In practice, two different systems based on this basic principle of additive color mixing are implemented in color LCD displays.

The first is a "simultaneous additive color mixing process." To apply this system for a color LCD, three color filters of R, G, and B are used in combination with three LCD panels. Using these filters, three color images are simultaneously projected onto a screen where the color images are superimposed and merged into one color image. This idea is currently widely implemented in the mass production of modern LCDs.

The second is a field sequential color (FSC) principle based on a "successive additive color mixing process." As shown in the diagram 100 of FIG. 1, this process utilizes the resolution limit of the human eye in the time domain. More specifically, this process utilizes the phenomenon that when successive color changes are too fast for the human eye to perceive, the persistence of the previous color causes the color to be mixed with the succeeding color, and these colors are combined and perceived as one color to the human eye. As in the simultaneous additive color mixing process, any desired color can be obtained at each pixel, so that the system achieves high image definition and also provides excellent color reproduction. The first standard color TV system utilized the field sequential method, but the method is not widely implemented in conventional mass-produced LCDs.

However, the field sequential color method based on the successive additive color mixing process has several advantages over the simultaneous additive color mixing process. First, the process of three-color filter manufacturing is very complex and expensive, whereas the manufacturing associated with the successive additive color mixing process is relatively simple and inexpensive in comparison. Second, the light transmission of a display cell in the absence of the three color filters may be three times higher, which allows for a significant reduction in power consumption using the successive additive color mixing process at the same levels of brightness and resolution for the display.

Fast switching ferroelectric liquid crystal (FLC) displays (FLCD) are good candidates for FSC LCDs, as FLCDs have been shown to have better response times than conventional nematic liquid crystals. The problems typically associated with FLCDs, such as quality of FLC alignment on sufficiently large surface area, can be effectively solved by using the photo-alignment technology described by Chigrinov et al., *Photoalignment of Liquid Crystalline Materials: Physics and Applications*, 248 pp., pp. 143-148, Wiley, August 2008, which is herein incorporated by reference in its entirety (hereinafter "Chigrinov on Photoalignment").

It will be appreciated that the inventors have created the above body of information for the convenience of the reader; the foregoing is a discussion of problems discovered and/or appreciated by the inventors, and is not an attempt to review or catalog the prior art.

BRIEF SUMMARY OF THE INVENTION

LCD implementations of color displays based on FSC demand an increase of at least three times the operating speed of display cells utilizing the additive color mixing process with a color frame frequency of at least 60 Hz. Thus, the invention relates to liquid crystal display cells with fast response and continuous gray scale. The liquid crystal cell is based on a field-sequential color system ("FSC") and comprises a chiral smectic liquid crystal whose helix pitch is less than thickness of liquid crystal layer placed between two polarizers, as well as a source of voltage applied to electrodes of the cell, wherein the amplitude of the applied voltage is less than the critical voltage amplitude of the helix unwinding. Applications of liquid crystal display cells with fast response and continuous gray scale include fast response photonics devices, such as modulators, filters, attenuators, etc.

The liquid crystal layer of liquid crystal cells according to the present invention has one steady state corresponding to twisted helix without applied voltage. In this case, the principal optical axis coincides with the helical axes, but deviates from steady state under the action of a driving voltage, providing thereby an electro-optical response of the display which exhibits continuous gray scale in light transmission or reflection that is hysteretic-free and non-sensitive to the driving voltage polarity over a broad range of driving voltage frequencies, if the steady orientation of the principle axes is parallel or perpendicular to the light polarization plane. The cells also exhibit "perfect" (i.e., capable of generating any gray level and independent of driving voltage polarity) high frequency (i.e., over 1 kHz) V-shaped mode in the envelope curve of light transmission saturation states, given symmetric rectangular alternative sign driving voltage pulses. Different embodiments of the invention may use ferroelectric liquid crystal, ferroelectric liquid crystal, or antiferroelectric liquid crystal.

Other objects and advantages of the invention will become apparent upon reading the following detailed description and upon reference to the drawings.

BRIEF DESCRIPTION OF THE SEVERAL VIEWS OF THE DRAWING(S)

DETAILED DESCRIPTION OF THE INVENTION

Figure 2:
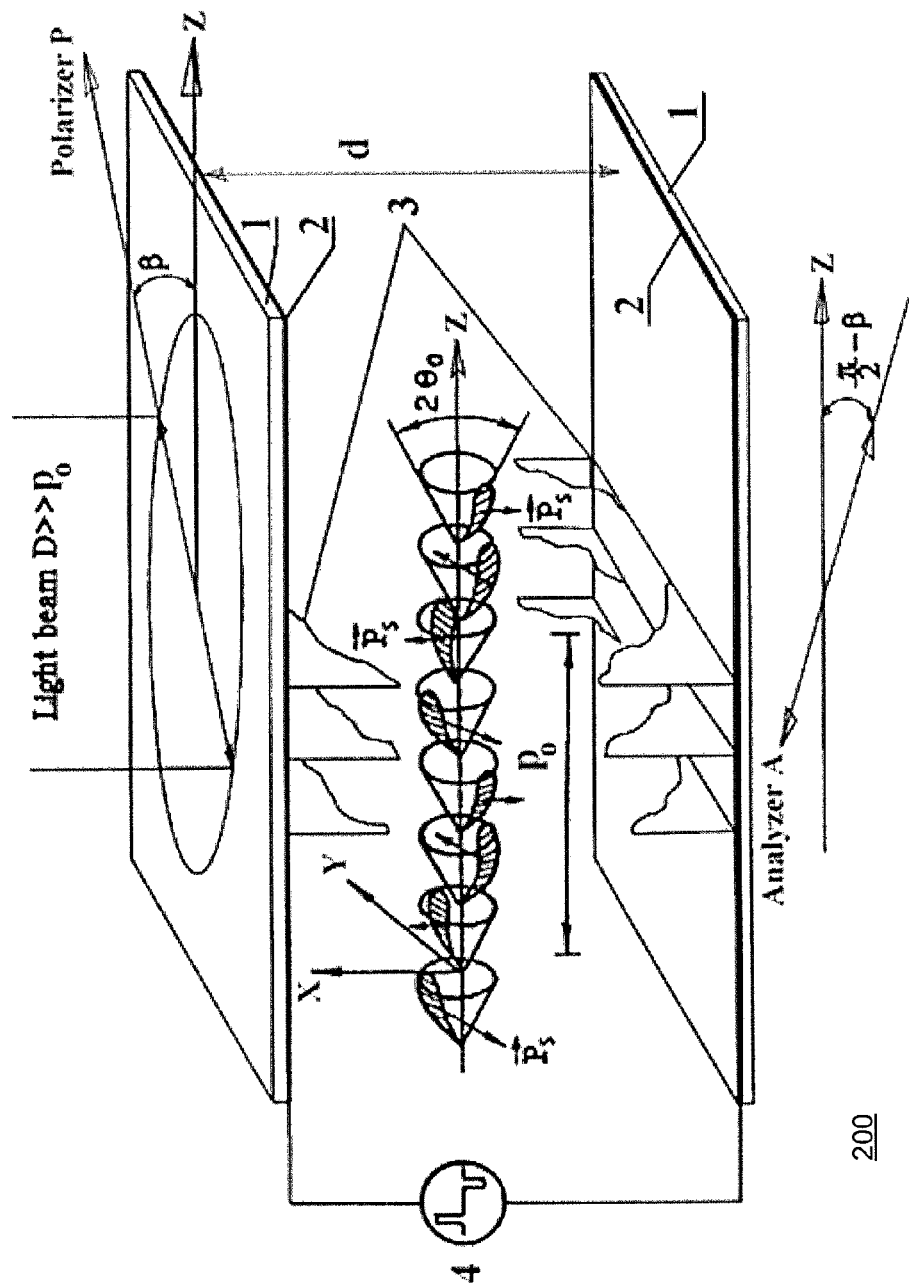
FIG. 2 is a schematic showing the helical structure of a chiral smectic C* phase layer in a liquid crystal device according to one embodiment.

Turning now to FIG. 2, a schematic 200 showing a liquid crystal cell according to one embodiment of the present invention. In this embodiment, a chiral liquid crystal layer in a liquid crystal cell is an FLC of chiral smectic C* phase whose helical structure has a pitch $p_0$ smaller than a gap d between the first and the second substrates at any conditions at a boundary between the liquid crystal and the substrates, and at any applied driving voltage V, which should be less than a critical voltage $V_c$ of the helix unwinding. Transparent substrates 1 are positioned outside of transparent conductive layers 2. The substrates 1, for example, may be made of glass or plastic. The conductive layers 2 (which may be ITO (indium tin oxide)) are covered with any aligning layer, and are connected to a source of driving voltage 4. Smectic layers 3 are positioned perpendicular to the substrates 1. β represents an angle between a polarizer plane and the helix axes in the absence of an applied voltage. D represents a light beam aperture, which is considerably larger than the helix pitch. X, Y and Z coordinate axes are also depicted with the Z-axis aligned along the helix axes and the principle optical axes of the liquid crystal layer, the X-axis perpendicular to the substrates, and the Y-axis parallel to the substrates. It will be appreciated that the source of driving voltage 4 may be a thin films transistor (TFT) matrix, which is particularly suitable for liquid crystal cells with multiple pixels (e.g. LCD displays).

Figure 3:
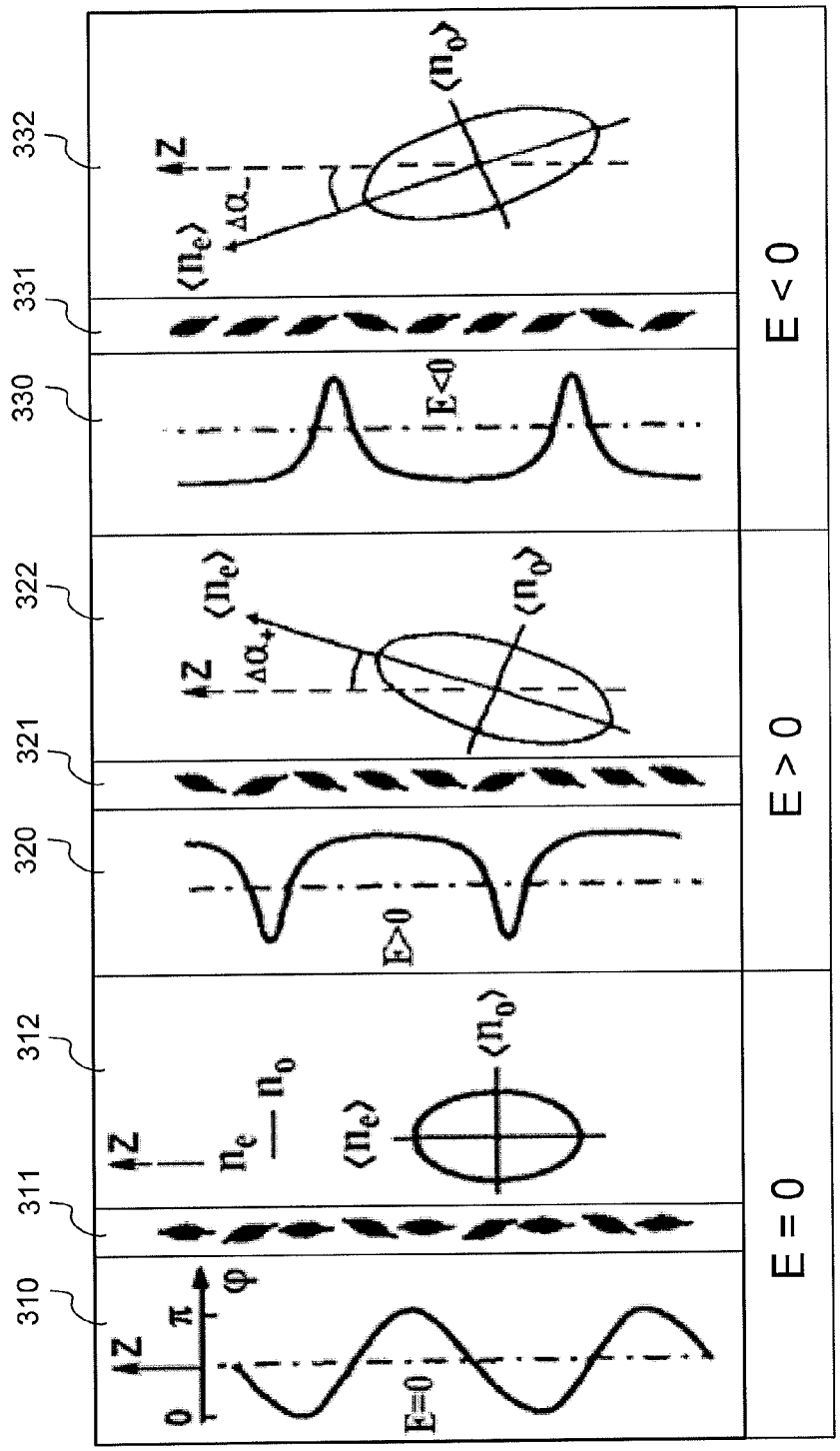
FIG. 3 is a diagram showing azimuthal φ(z) distributions of smectic C8 director in the XY plane, local distributions of the refractive index ellipsoid along the Z axis, and ellipsoids of refractive index averaged over the light aperture for E=0, E>0, and E<0, where the X, Y and Z axes are defined according to the embodiment depicted in FIG. 2.

A ferroelectric smectic C* liquid crystal operates in an electro-optical mode known as the DHF (deformed helix ferroelectric liquid crystal) effect when the helix pitch $p_0$ is less than the FLC layer thickness $d_{FLC}$ and the applied electric field E is less than critical field $E_c$ of the helix unwinding. The electrically controlled birefringence of DHF FLC cells is the basis of fast phase modulation of the light, which has application in FSC display devices. The electrically controlled birefringence $\Delta n_{eff}(E) = \langle n_e(E) - n_o(E) \rangle$ is based on the FLC helical structure deformation and deviation $\Delta \alpha(E)$ of the FLC principle axes in an electric field, as depicted by FIG. 3. FIG. 3 further illustrates the deviation of linear polarized light polarizing plane that occurs as a result of $\Delta \alpha(E)$ deviation together with the phase modulation of the light passing through the chiral smectic C* layer.

When the helix axes and the principle optical axes of the chiral smectic C* layer 3—which is sandwiched between a pair of substrates 1 and placed between a crossed polarizer and analyzer—are parallel or perpendicular to the polarizer plane (i.e., β from FIG. 2 equals 0 or π/2), and AC rectangular voltage pulses $V<V_c$ are applied to the liquid crystal, first, the electro-optical response is not sensitive to the driving voltage polarity and its characteristic time is less than 100 μs (described below in connection with FIG. 6); and second, the cells exhibit perfect high frequency (i.e., over 1 kHz) V-shaped mode (described below in connection with FIG. 7-8) in the envelope curve of light transmission saturation states, with symmetric rectangular alternative sign driving voltage pulses. It will be appreciated that, although embodiments of the invention are discussed herein with respect to crossed polarizers, the same effect may be accomplished by using a reflective liquid crystal cell and one polarizer.

Based on the chiral dopant described in Pozhidaev et al., "New Chiral Dopant Possessing High Twisting Power," Mol. Cryst. Liq. Cryst., 509, 1042-1050 (2009), which is incorporated herein by reference in its entirety, with excerpts attached hereto in Appendix I (hereinafter "Pozhidaev et al. (Appx. I)"), a new generation of DHF FLC mixtures, possessing a helix pitch of $p_0$ being around 300 nm to 330 nm and very high birefringence may be used to produce liquid crystal cells. Pozhidaev et al. (Appx. I) shows that increasing the concentration of chiral dopant added to the DHF FLC mixture lowers the helix pitch of the mixture, but adding too much of the chiral dopant negatively influences other parameters of the mixture. The more "efficient" a type of chiral dopant is, the less that needs to be used, thus preventing degradation of other parameters of the cell. Because the efficiency of the chiral dopant described by Pozhidaev et al. (Appx. I) is relatively high compared to conventional chiral dopants, DHF FLC cells may be produced with low helix pitch (<400 nm) that exhibit the electro-optical characteristics as described below.

Figure 4:
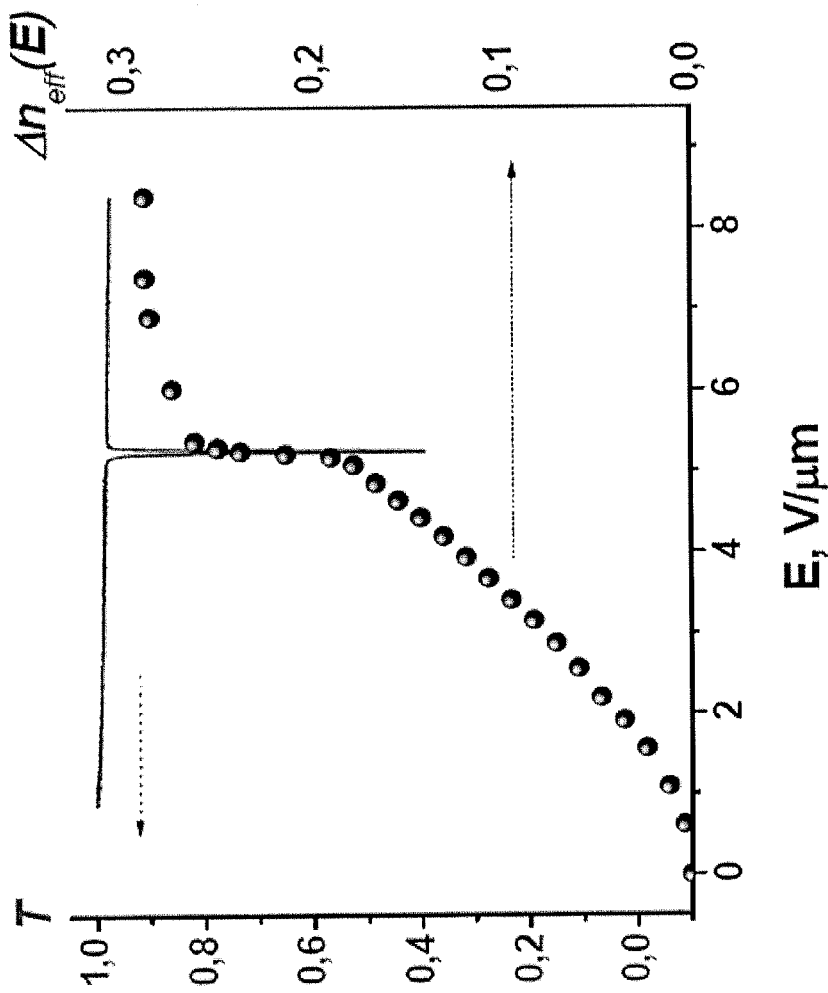
FIG. 4 is a graph showing the electrically controlled birefringence $\Delta n_{eff}(E)$ and transmittance based on applied field during helix unwinding in a DHF FLC (deformed helix ferroelectric liquid crystal) according to one embodiment.

Consequently, the light scattering in a visible spectral range is excluded completely except of the region near the critical voltage, as shown in FIG. 4. FIG. 4 is a graph 400 that shows DHF FLC electrically controlled birefringence $\Delta n_{eff}$ (E) during the helix unwinding (shown by the dots). Additionally, the graph 400 also shows dependencies on the applied electric field of the light transmission (solid line) of a polarizer-free DHF FLC with short helix pitch ($p_0$=0.33 µm). Measurements were carried out at a driving voltage frequency 1 kHz, wavelength $\lambda$=0.63 µm and T=23° C., on a 1.75 µm thick DHF FLC cell based on ferroelectric smectic C* FLC-587 developed at P.N. Lebedev Physical Institute of Russian Academy of Sciences.

Additionally, the photo-alignment technique described in Chigrinov on Photoalignment may be used for producing the FLC cells. ITO surfaces of FLC cells were covered with a 10-20 nm photo-aligning substance—e.g., azobenzene sulfonic dye SD-1 layers. The azo-dye solution was spin-coated onto ITO electrode and dried at 155° C., such that the ITO surfaces were covered with 20 nm layers of SD-1. A polarized UV light was achieved by using a super-high pressure Hg lamp, an interference filter at 365 nm and a polarizing filter. UV light with an intensity of 6 mW/cm² and a wavelength of 365 nm was irradiated normally onto the SD-1 layers. The cells had a size of 13×13 mm², a width patch area of 2 mm, thickness of glass substrates of 1.1 mm, and electrode areas of 5×5 mm². Different cells with cell gaps of 1.7 µm, 10 µm, 21 µm and 50 µm were produced. By comparing the different DHF FLC cells, it was discovered that the alignment quality improves with increasing $d_{FLC}$ from 1.7 µm to 50 µm, likely due to helix distortion near solid aligning surfaces having smaller importance with respect to the bulk regular orientation in FLC layers with higher thickness. While photo-alignment is described herein as one method for producing an alignment layer, it will be appreciated that one skilled in the art could produce an alignment layer through other methods known in the art such as through oblique evaporation, plasma beam etching, or by using a rubbed polyimide layer.

The light transmission $T_h$ of DHF FLC cells placed between crossed polarizers is described by the relationship $$T_h = \sin^2 2[\beta \pm \Delta\alpha(E, f)] \cdot \sin^2 \frac{\Delta\Phi(E, f)}{2} \quad (1)$$

where $\beta$ is an angle between the input linear polarized light polarizing plane and z axes (see FIG. 4). $\Delta\Phi$ is expressed as $$\Delta\Phi(E) = \frac{2\pi d_{FLC} \Delta n_{eff}(E, f, \lambda)}{\lambda} \quad (2)$$

In these equations, $\lambda$ is the wavelength, f is frequency, and $\Delta\Phi$ (E, f, $\lambda$) is the phase shift between extraordinary and ordinary light beams transmitted by DHF-cells.

A geometry with $\beta$=0 was selected in all experiments to provide non-sensitivity to the driving voltage polarity electro-optical response. Maximal light transmission under this condition, as it follows from these equations, occurs if $\Delta\alpha$=45°, and $\Delta\Phi$=$\pi$. Thus, the tilt angle $\theta$ of the FLC should be close to 45° for providing of maximal light transmission at $\beta$=0. Liquid crystal cells using FLC-587 have $\theta$=37°, with $\Delta\alpha \leq \theta$. An FLC layer thickness of $d_{FLC}$=1.75 µm was selected to satisfy $\Delta\Phi$=$\pi$ roughly at E≅5 V/µm, based on the equations above and the relationship between transmittance and applied electric field shown in FIG. 4.

Figure 5:
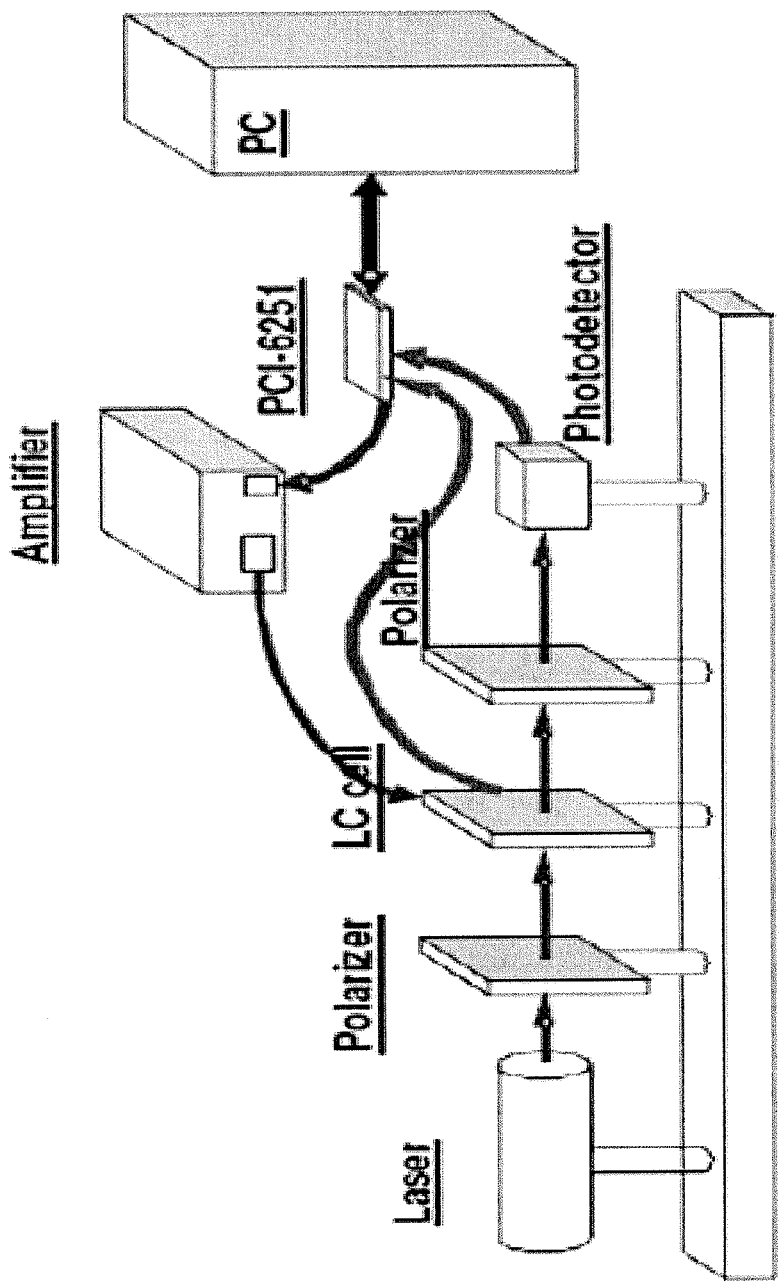
FIG. 5 is a diagram showing an experimental set-up for testing the performance of liquid crystal cells.

Electro-optical measurements to test the performance of the liquid crystal cell were performed in an automatic regime. An experimental set-up 500 may be configured as shown in FIG. 5. The basic element of this experimental set-up 500 is a computer data acquisition (DAQ) board NIPCI-6251 from National Instruments. This board has two analog outputs and 16 analog inputs, and the minimal registration time is 1 µs. The Wideband Power Amplifier KH model 7600 from Krohn-Hite Corporation with amplification coefficients 5 and 25 times may be used. It gives the capability of outputting a continuously variable voltage up to ±250 V. A photo-detector is connected to input board plate for optical measurements.

The software for the experimental set-up has built-in functions for analog output-input. The program has three functional blocks which operate with this set-up very effectively. The first block is a programmable generator that realizes any form of signal with a duration of 2000 points. The duration of one point can be set from 1 µs to 1 s. The second block is a measuring block, which saves 4000 values of the input voltage with steps from 1 µs to 1 s. The operation of the first and the second blocks is synchronized inside the DAQ board and cannot be disturbed by computer interruptions. The third block is used to accumulate the experimental data.

Using this set-up, tests were performed on DHF FLC cells with $\beta$=0 showing that, first, the electro-optical response is not sensitive to the driving voltage polarity, and second, that the cells exhibit perfect high frequency (over 1 kHz) V-shaped mode in the envelope curve of light transmission saturation states with symmetric rectangular alternative sign driving voltage pulses.

Figure 6:
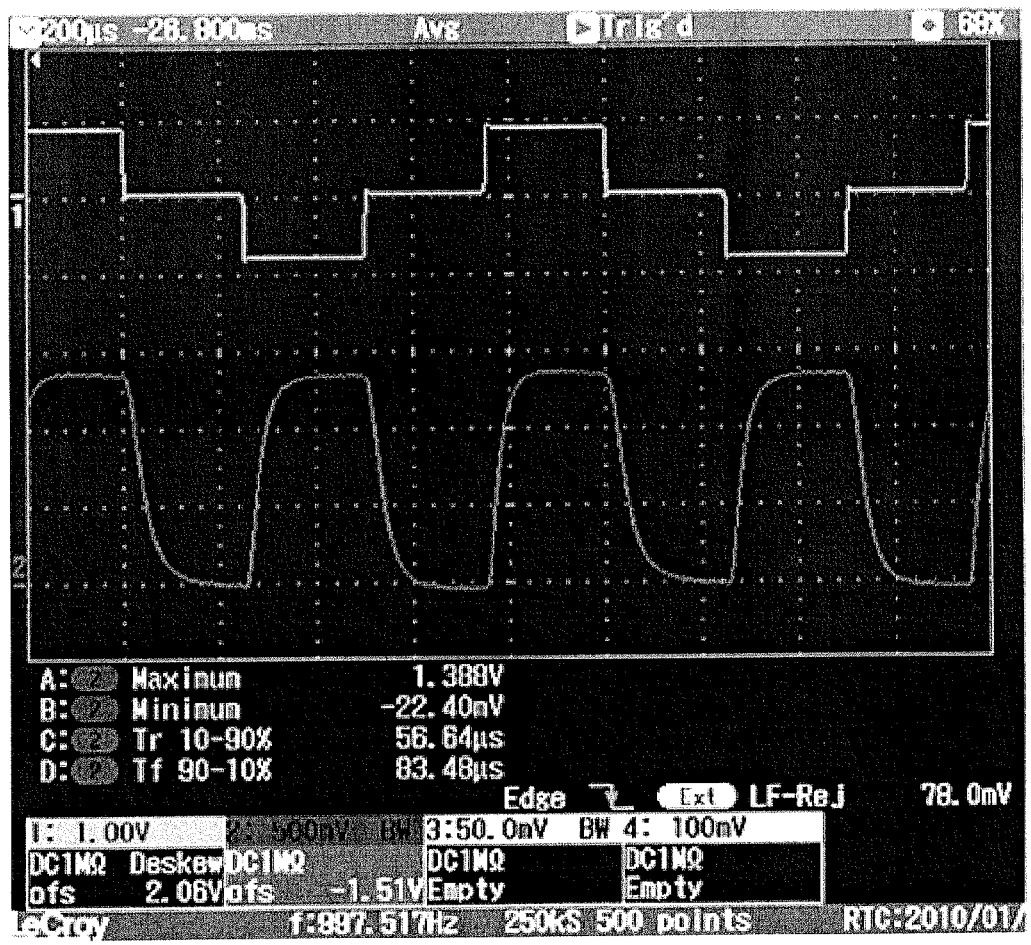
FIG. 6 is an oscilloscope screen showing a driving voltage waveform (top) applied to a liquid crystal cell in one embodiment and the corresponding electro-optical response of the cell (bottom) according to one embodiment.

FIG. 6 depicts an oscilloscope screen 600 corresponding to a DHF FLC cell with $d_{FLC}$=1.75 µm filled with FLC-587 in the experimental set-up of FIG. 5. The top waveform depicted in FIG. 6 shows a driving voltage waveform applied to the cell with a voltage amplitude of ±8.8 V and a frequency of 1 kHz. The bottom waveform depicted in FIG. 6 shows the electro-optical response of the cell, with the cell placed between two crossed polarizers at $\beta$=0 and measured at λ=0.63 µm. The electro-optical response frequency is 2 kHz. As can be seen by FIG. 6, the results were similar to liquid crystalline cells based on nematic liquid crystals (NLCs), but the response time was less than 100 µs for both $\tau_{0.1-0.9}^{on}$ (≅57 µs) and $\tau_{0.1-0.9}^{off}$ (≅84 µs) and independent of the applied voltage amplitude at E<$E_c$.

Figure 7:
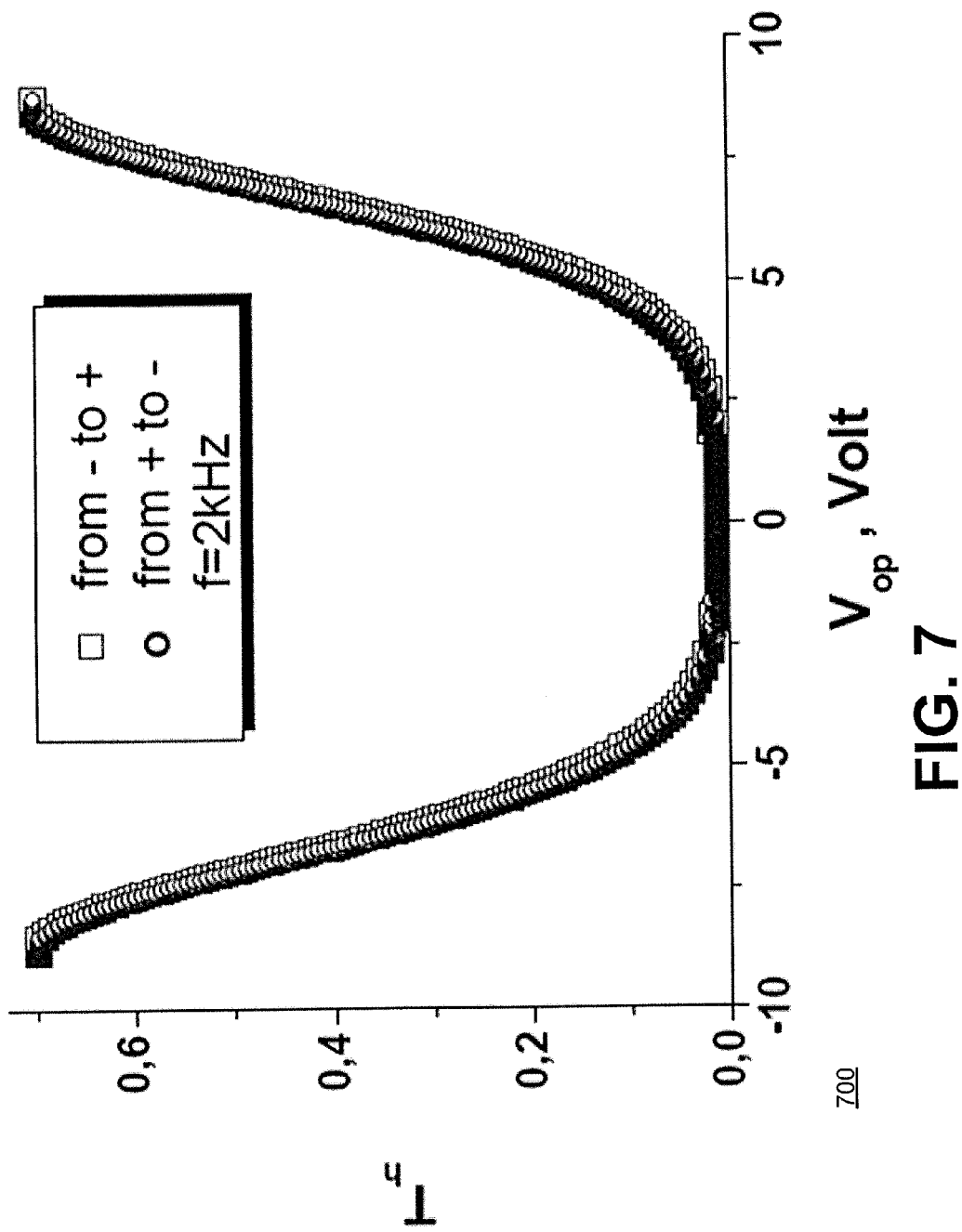
FIG. 7 is a graph showing the V-shaped mode of a cell according to one embodiment in the envelope curve of light transmission saturation states, with symmetric rectangular alternative sign driving voltage pulses at an electro-optical response frequency of 2 kHz.
Figure 8:
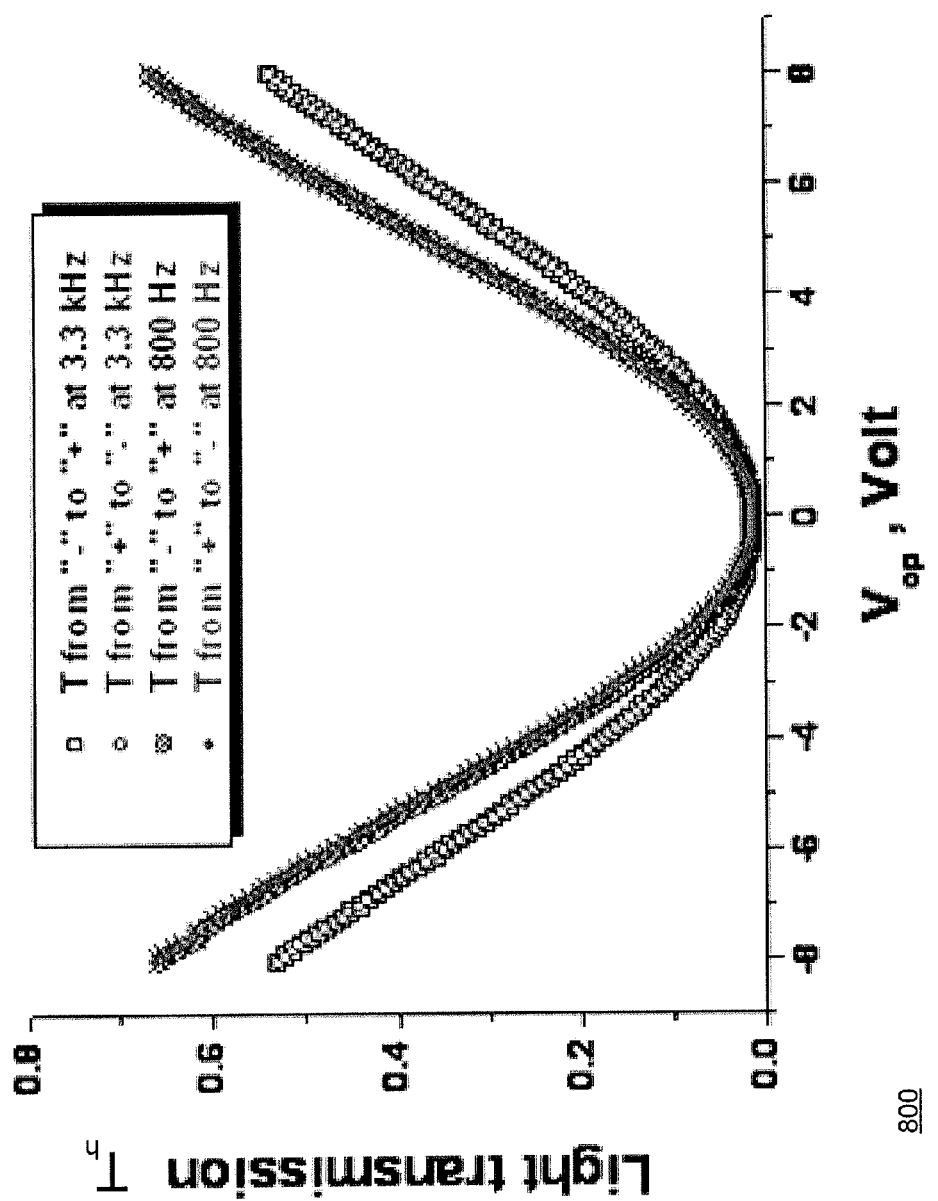
FIG. 8 is a graph showing the V-shaped mode of a cell according to one embodiment in the envelope curve of light transmission saturation states, with symmetric rectangular alternative sign driving voltage pulses at driving voltage frequencies of 800 Hz and 3.3 kHz.

FIG. 7 is a graph 700 depicting the V-shaped mode of the cell described above with respect to FIG. 6 in the envelope curve of light transmission saturation states, measured with the symmetric rectangular alternative sign driving voltage pulses shown at the top of FIG. 6 (driving voltage frequency of 1 kHz). FIG. 8 is a graph 800 depicting the same thing as FIG. 7, except at voltage driving frequencies of 800 Hz and 3.3 kHz. The light transmission $T_h$ in FIGS. 7 and 8 was evaluated in comparison with transmission of an empty cell placed between parallel polarizers, with the transmission of the empty cell defined as $T_h$=1.

It can be seen from FIGS. 7 and 8 that the cells exhibit perfect high frequency (over 1 kHz) V-shaped mode in the envelope curve of light transmission saturation states, with symmetric rectangular alternative sign driving voltage pulses. This V-shaped switching does not depend on the driving voltage frequency in a rather broad range of 0.2-4 kHz. Liquid crystal cells having an electro-optical response with these properties of being hysteretic free and non-sensitive to the driving voltage polarity are very appropriate for applications in display devices, where rectangular alternative sign driving voltage pulses are applied.

Figure 9:
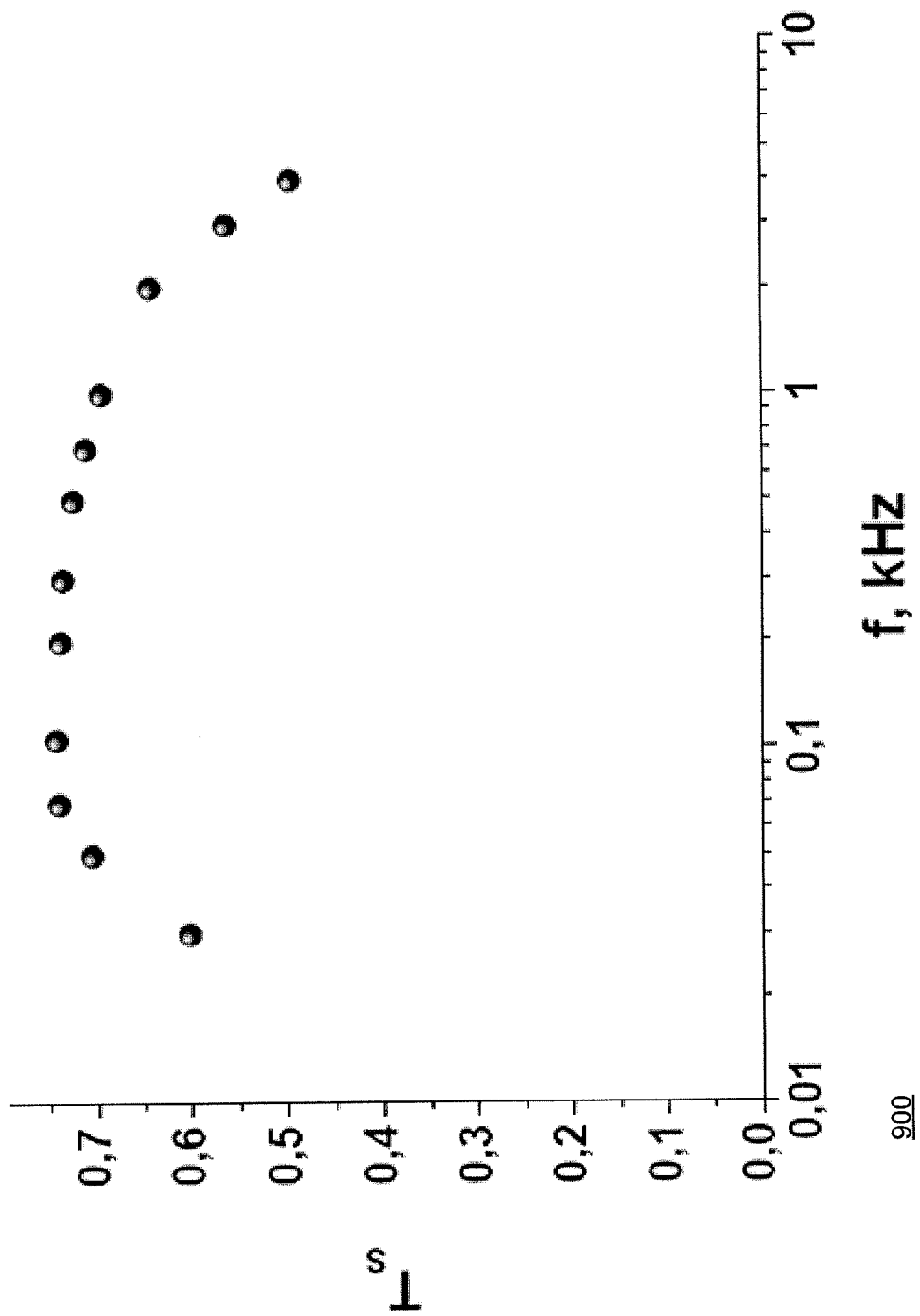
FIG. 9 is a graph showing the dependence of the saturation level of V-shaped curves on driving voltage frequency of a cell according to one embodiment.
Figure 10:
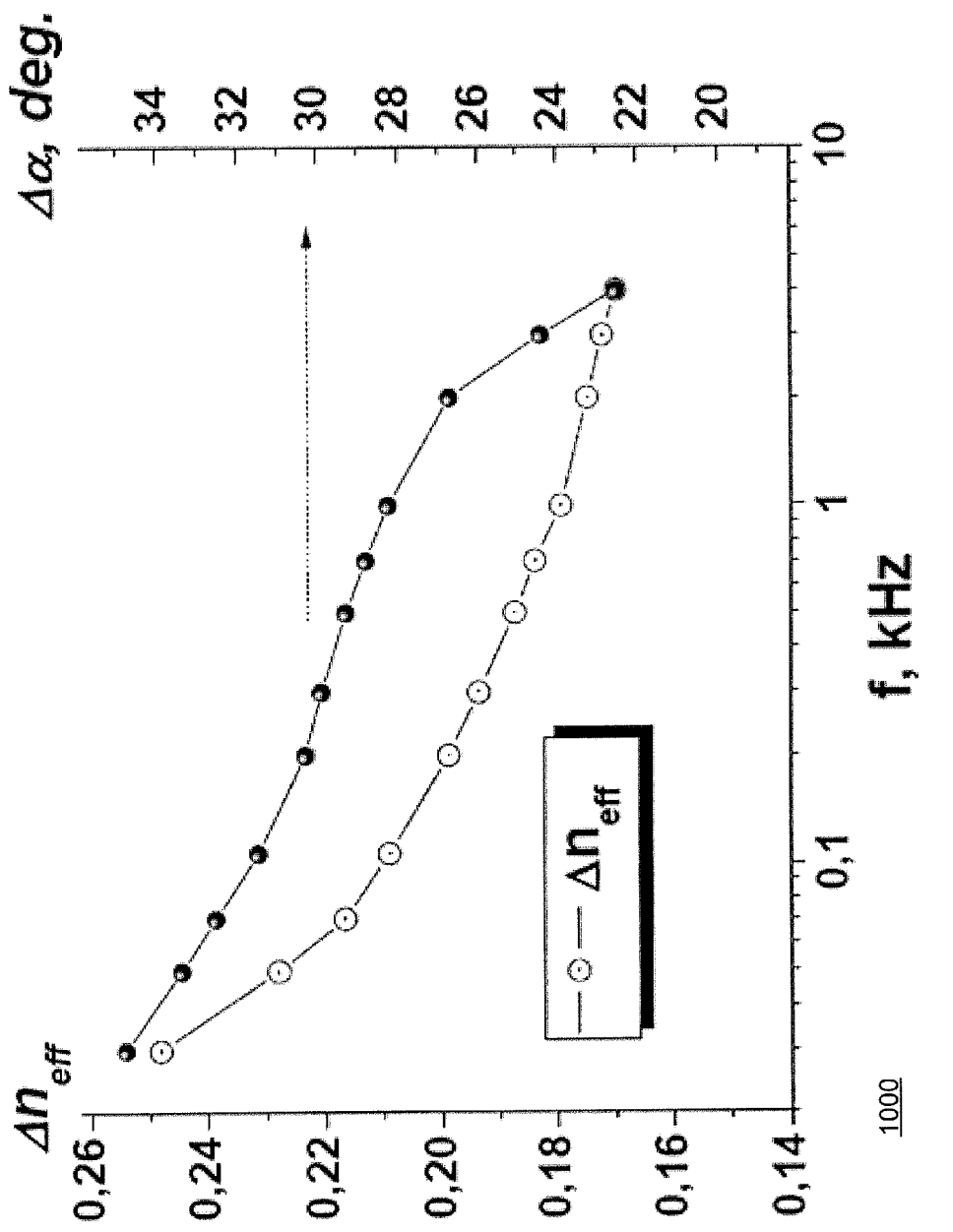
FIG. 10 is a graph showing dependencies of $\Delta n_{eff}$ and $\Delta \alpha$ on driving voltage frequency of a cell according to one embodiment.

On the other hand, the saturation level $T_s$ (maximal light transmission) of V-shaped curves depends on the driving voltage frequency, as shown in graph 900 of FIG. 9, because both $\Delta n_{eff}$ and $\Delta\alpha$ depend on frequency as it is shown in graph 1000 of FIG. 10. The measurements depicted by FIGS. 9 and 10 were carried out on a cell with FLC-587 having $d_{FLC}$=1.75 µm, β=0, and λ=0.63 µm. The light transmission $T_s$ was evaluated in comparison with transmission of empty cell placed between parallel polarizers, with that transmission defined as $T_s$=1.

The dependence depicted in graph 900 of FIG. 9 may be evaluated with high accuracy using relationships (1) and (2) discussed above and the $\Delta n_{eff}$ and $\Delta\alpha$ plotted in graph 1000 of FIG. 10. It will be appreciated that FIGS. 9 and 10 depict the electro-optical response of a cell with FLC-587 having $d_{FLC}$=1.75 µm, β=0, and λ=0.63 µm, operated in DHF mode with driving voltage frequencies of up to 4 kHz and a driving voltage amplitude of V=±8.8 V. However, an operation frequency (i.e., driving voltage frequency) of as low as 480 Hz for a display cell having an electro-optical response that is non-sensitive to the driving voltage polarity and hysteretic free is quite sufficient for conventional active-matrix LCDs utilizing FSC. In particular, it will be appreciated that DHF FLC is suitable for FSC microdisplays, including pico-projectors.

Figure 11:
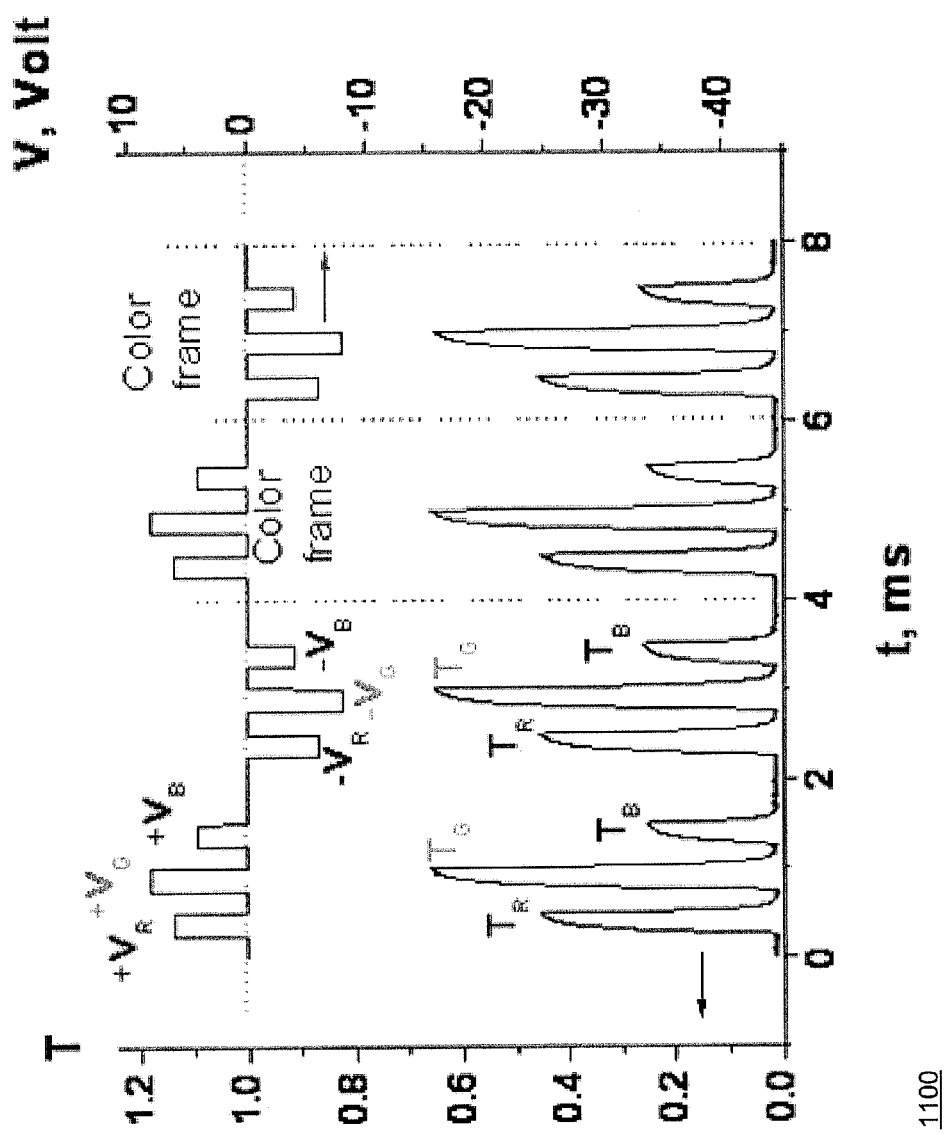
FIG. 11 is a graph showing a driving voltage waveform (top) applied to a liquid crystal cell in combination with three color LEDs according to one embodiment and the corresponding electro-optical response of the cell (bottom)

To demonstrate the use of a DHF FLC cell as described above in an FSC display application, the DHF FLC cell was operated in conjunction with LEDs of the three basic light colors red, green and blue (RGB). FIG. 11 depicts a graph 1100 illustrating how the intensity of basic light colors may be dynamically adjusted to control color coordinates based on the primary colors for an FLC-587 based cell with $d_{FLC}$=1.75 µm placed between crossed polarizers at β=0. The top waveform (corresponding to the right y-axis) shows the driving voltage pulses synchronized sequentially with corresponding red, green and blue light emitting diodes switching on and off, and the bottom waveform (corresponding to the left y-axis) shows the electro-optical response of the cell. Each color frame had a duration of 2 ms, and $T_R$, $T_G$ and $T_B$ are light transmissions of time sequential red, green and blue lights respectively. FIG. 11 shows that, inside the color frames, the light transmission of any basic color does not depend on the driving voltage pulses' polarity but only on the amplitude, so: $T_R(+V_R)=T_R(-V_R)$, $T_G(+V_G)=T_G(-V_G)$, and $T_B(+V_B)=T_B(-V_B)$. FIG. 11 also confirms that electrically-controlled light transmission that is hysteretic free and non-sensitive to the driving voltage polarity occurs for any basic color of light inside the color frame.

Figure 12:
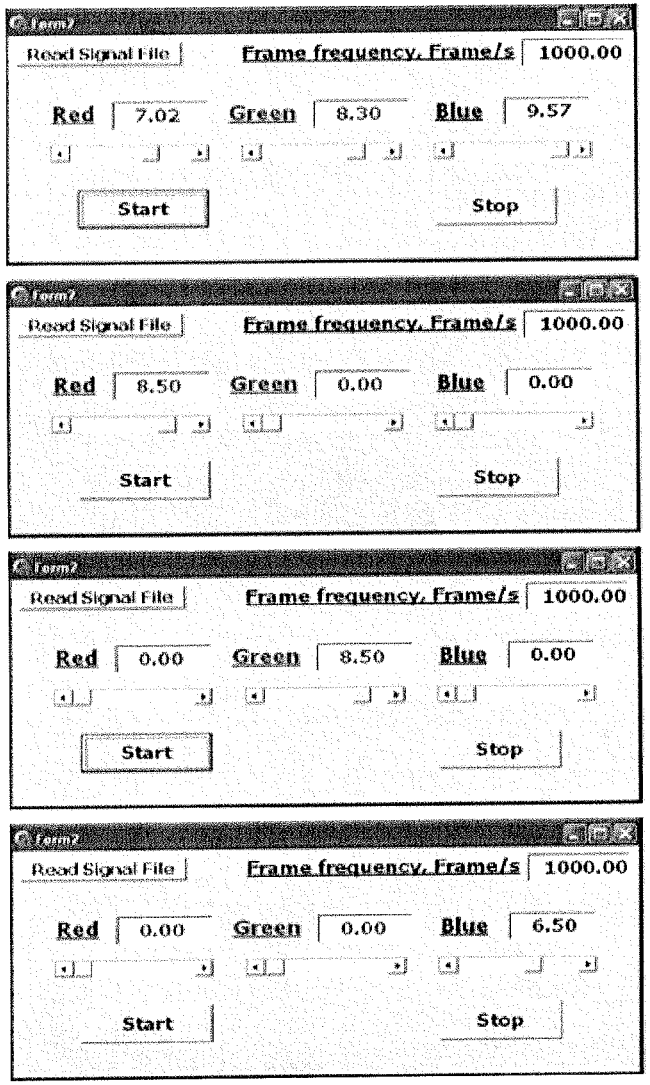
FIG. 12 shows screencaps (left) taken from a program indicating the parameters of an applied driving voltage and corresponding transmission spectra (right) in terms of intensity vs. wavelength according to one embodiment.
Figure 12:
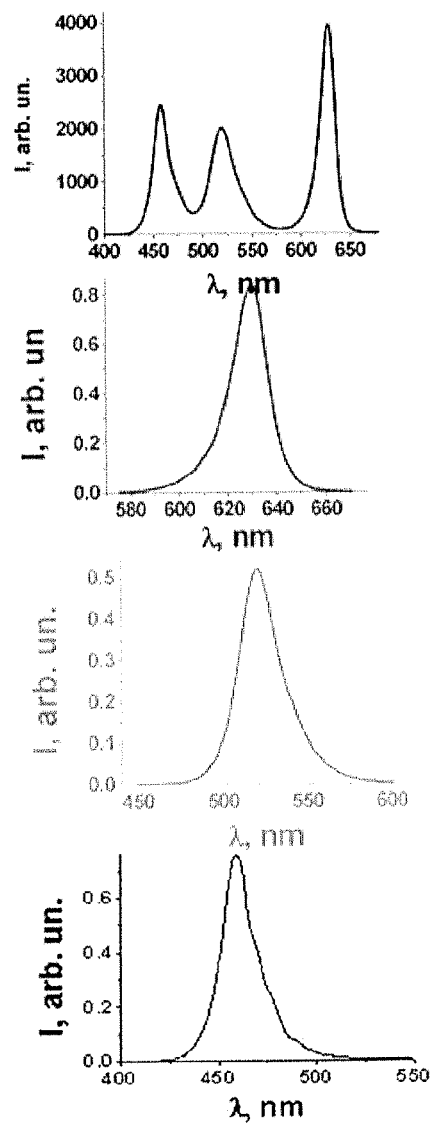
Figure 13:
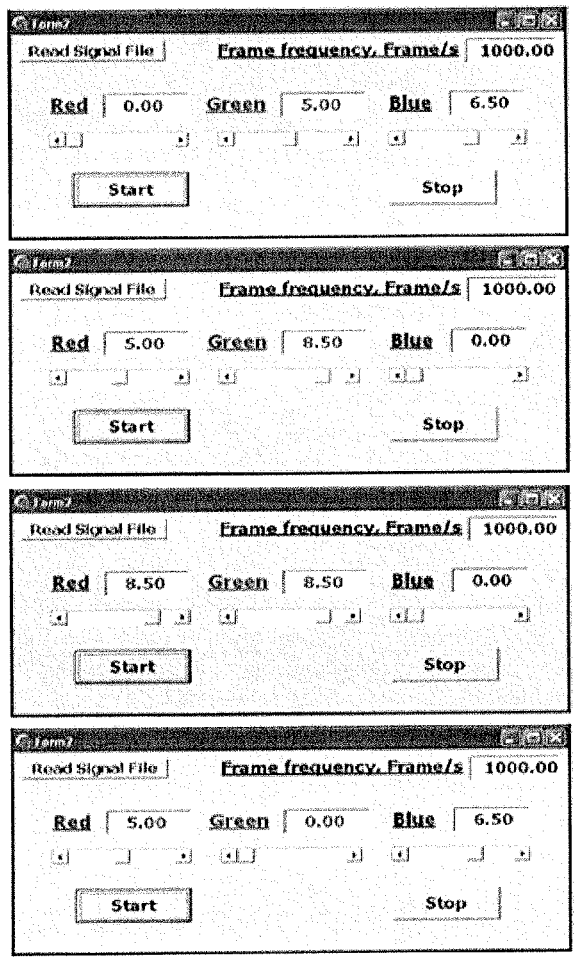
FIG. 13 shows screencaps (left) taken from a program indicating the parameters of an applied driving voltage and corresponding name of the color output (right) according to one embodiment.

FIG. 12 is an illustration 1200 showing how white, red, green and blue (respectively, from top to bottom) basic colors may be obtained in an FSC application at a color frame frequency of 1 kHz with corresponding light transmission spectra. The boxes on the left side of the illustration 1200 are boxes corresponding to a simple computer program for controlling the voltage pulses sent to the liquid crystal cell. By inputting numbers corresponding to the level of transmission desired for each of the three basic colors (RGB), light of a corresponding transmission spectrum may be obtained. FIG. 13 is an example 1300 showing input levels of RGB for some other intermediate colors—aquamarine, lime, yellow and magenta (respectively, from top to bottom)—obtained in the same FSC application at a color frame frequency of 1 kHz. It will be appreciated that the numbers entered into the boxes may be in arbitrary units, or may actually corresponding to actual voltage amplitudes of the driving voltage supplied to the liquid crystal cell.

In a further embodiment, by using a higher concentration of the chiral dopant described by Pozhidaev et al. (Appx. I), FLC mixtures with even shorter helix pitches ($p_0$≅150-200 nm) may be obtained for use in DHF FLC cells. These electrical optical cells are free from selective reflection and diffraction in the visible spectral range and therefore exhibit very perfect operation in DHF mode. It will be appreciated that the principles discussed above with respect to FIG. 3 and equations (1) and (2) are also applicable to the FLCs with even shorter helix pitches discussed here, with $\Delta n_{eff}$ of equation (2) being described by $\Delta n_{eff}=\Delta n_{eff}^{E=0}+\Delta n_{eff}(E)$.

If the incident polarized light propagates parallel to smectic layers of the DHF FLC with a sub-wavelength helix pitch, then the electrically-controlled birefringence is proportional to the square of the electric field:

$$\Delta n_{eff}(E) = (n_e - n_0)\frac{\sin^2 2\theta}{1 - \frac{3}{2}\sin^2\theta}G^2 E^2, \quad (3)$$

where θ is the tilt angle, $n_0$ and $n_e$ are the ordinary and extraordinary refractive indices, respectively, and $$G = \frac{\varepsilon_0 \chi_G}{P_s}, \quad (4)$$

where $\varepsilon_0$ is the vacuum permittivity, $P_s$ is the spontaneous polarization, and $\chi_G$ is the Goldstone mode dielectric susceptibility. As described in Pozhidaev et al., "Phase modulation and ellipticity of the light transmitted through a smectic C* layer with short helix pitch," Liq. Cryst. 37 (8), 1067 (2010), which is herein incorporated by reference in its entirety, deviation $\Delta\alpha(E)$<<θ of the FLC principle axis in electric field at β=0 is proportional to the electric field:

$$\Delta\alpha(E) = \frac{\sin 2\theta}{2\left(1 - \frac{3}{2}\sin^2\theta\right)} GE. \quad (5)$$

Thus, it can be seen that both $\Delta n_{eff}(E)$ and $\Delta\alpha(E)$ depend on dielectric susceptibility $\chi_G$, which is related to dielectric dispersion.

Figure 14:
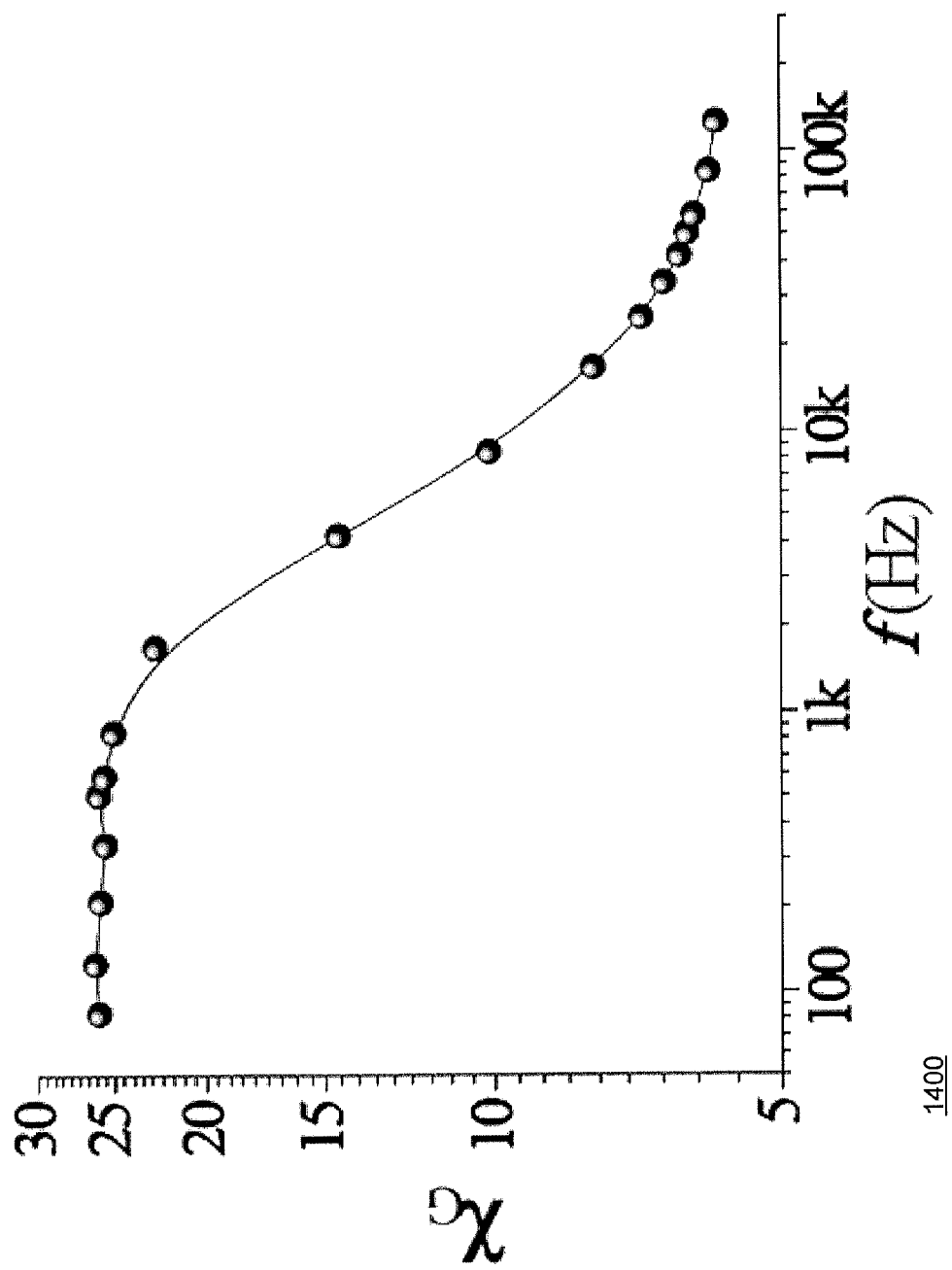
FIG. 14 is a graph showing dielectric dispersion of Goldstone mode dielectric susceptibility as a function of applied driving voltage frequency according to one embodiment.
Figure 15:
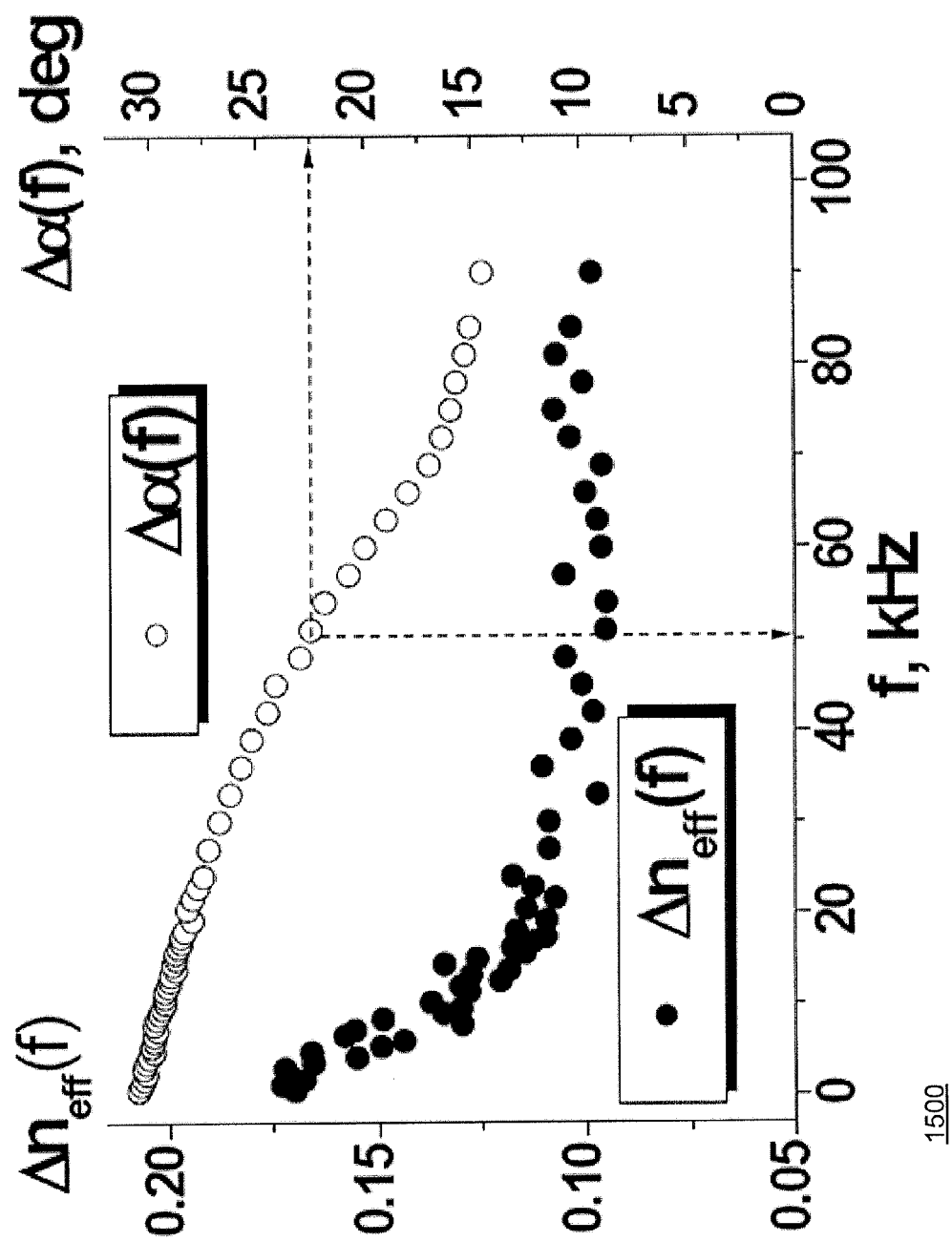
FIG. 15 is a graph showing the dependencies of $\Delta n_{eff}$ and $\Delta \alpha$ on the applied voltage frequency according to one embodiment.

Typical dielectric dispersion of a DHF FLC cell with a sub-wavelength helix pitch may be observed very clearly in a broad frequency range between 1 kHz and 100 kHz. For a DHF FLC cell produced with FLC-587 at T=22° C. having $d_{FLC}$=3 μm, spontaneous polarization $P_s$=1.5×10⁻³ C/m², helix pitch $p_0$=150 nm and tilt angle θ=35° and where λ=0.628 μm, graph 1400 of FIG. 14 shows the dielectric dispersion of the Goldstone mode dielectric susceptibility based on frequency of the applied driving voltages. Graph 1500 of FIG. 15 shows the dispersions $\Delta n_{eff}(f)$ and $\Delta\alpha(f)$ over the same frequency range as the dispersion $\chi_G(f)$ shown in FIG. 14. Thus, although the results do not match exactly, data corresponding to either $\Delta n_{eff}(f)$ and $\Delta\alpha(f)$ or $\chi_G(f)$ may be used with equations (3)-(5) to predict trends regarding other characteristics of a DHF FLC based on applied driving voltage frequency.

At least two main electro-optical effects may be observed in the DHF FLC cell in this embodiment. The difference between these effects is associated primarily with the incident light polarization plane orientation relative to the principle optical axis of the helical structure. Two orientations that correspond to two main electro-optical modes of DHF FLC are the most important: $|\beta|=|\Delta\alpha|$ and β=0 or π/2.

Figure 16:
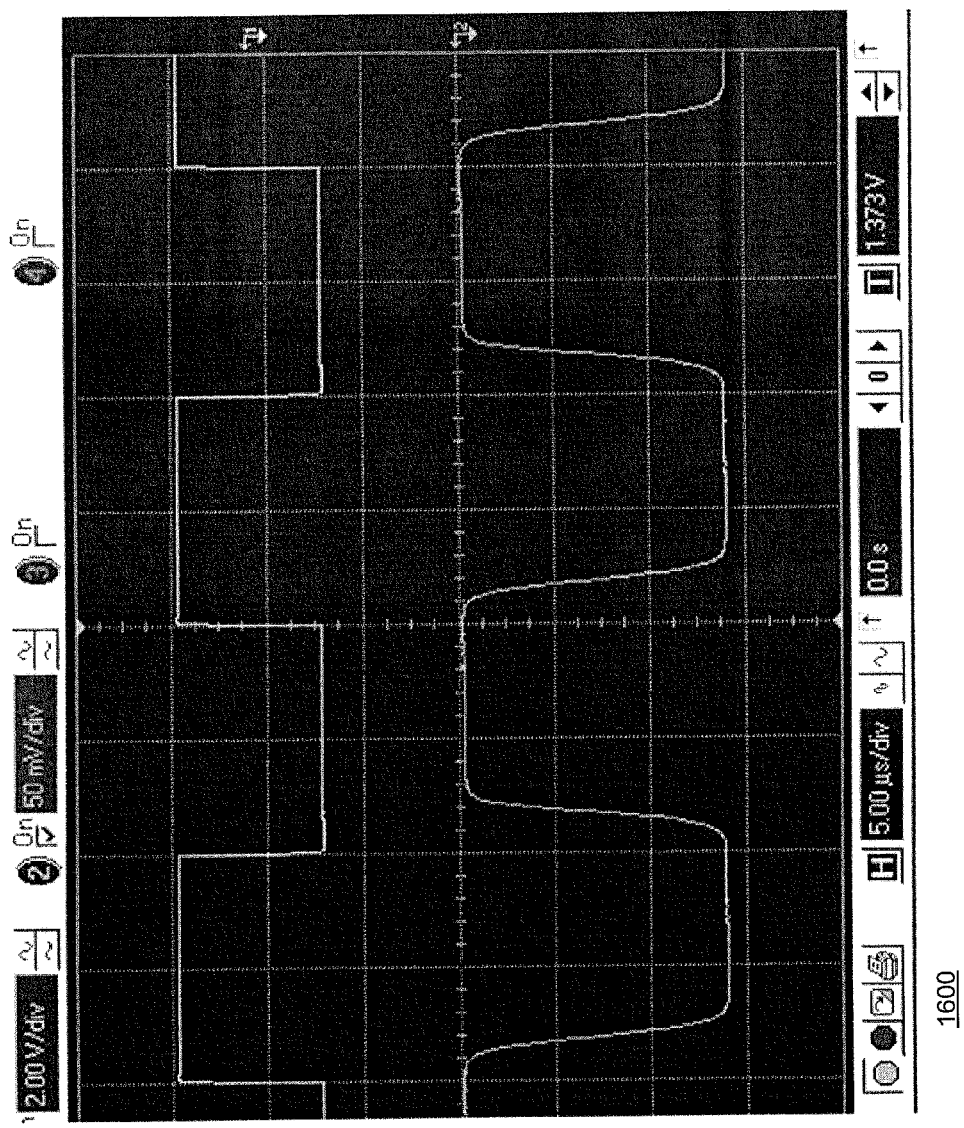
FIG. 16 is an oscilloscope screen showing a driving voltage waveform (top) applied to a liquid crystal cell according to one embodiment and the corresponding electro-optical response of the cell (bottom)

In the first mode, when $|\beta|=|\Delta\alpha|$, the electro-optical response is sensitive to the polarity of the applied voltage, similar to the response of conventional SSFLC (surface stabilized ferroelectric liquid crystal) cells. However, the response of the DHF FLC cell is considerably faster than the response of conventional SSFLC cells. FIG. 16 depicts an oscilloscope screen 1600 showing a driving voltage waveform (top) with amplitude ±15 V and frequency of 50 kHz applied to the FLC-587 based cell described above (with T=22° C., $d_{FLC}$=3 μm, λ=0.628 μm) with $\beta=\Delta\alpha$=22.5° and the electro-optical response of the cell (bottom), which also has a frequency of 50 kHz. It can also be seen from FIG. 16 that the response time $\tau_{0.1-0.9}\cong 1$ μs at the driving voltage frequency of 50 kHz.

During operation of the cell in the dispersion region (see FIG. 15), real deviations of molecules from their equilibrium positions become smaller with increasing applied voltage frequency. Consequently, the time needed to reach the new equilibrium positions decreases with increasing applied voltage frequency. However, the condition to achieve maximum light transmission of the DHF FLC is not dependent on the magnitude of the deviations of the molecules. To satisfy the conditions of maximum light transmission, the following conditions (derived from equations (1) and (2)) should be satisfied:

$$\beta = \Delta\alpha = 22.5°, \text{ and} \quad (6)$$

$$\frac{\Delta n_{eff} d_{FLC}}{\lambda} = \frac{1}{2}. \quad (7)$$

For the DHF FLC cell described in this embodiment, the conditions (6) and (7) are satisfied at the control voltage frequency f=50 kHz, as shown by dotted arrows in graph 1500 of FIG. 15. The conditions (6) and (7) may also be satisfied at even higher frequencies: for example, in the context of other types of devices, an electro-optical response time of $\tau_{0.1-0.9}$=850 ns at f=85 kHz has been achieved in Chigrinov et al., "Liquid crystal switchers for Fiber Optics," Second Asia-Pacific Polymer Fiber Optics Workshop, 149 (2003), which is incorporated herein by reference in its entirety. Thus, when $|\beta|=|\Delta\alpha|$, the electro-optical mode of a DHF FLC may provide sub-microsecond response times, which are practically independent of temperature. Independence of temperature has been shown in the context of similar chemical mixtures in Pozhidaev et al., "High Frequency and High Voltage Mode of Deformed Helix Ferroelectric Liquid Crystals in a Broad Temperature Range," vol. 246 (1-4), 235 (2000), which is incorporated herein by reference in its entirety.

Figure 17:
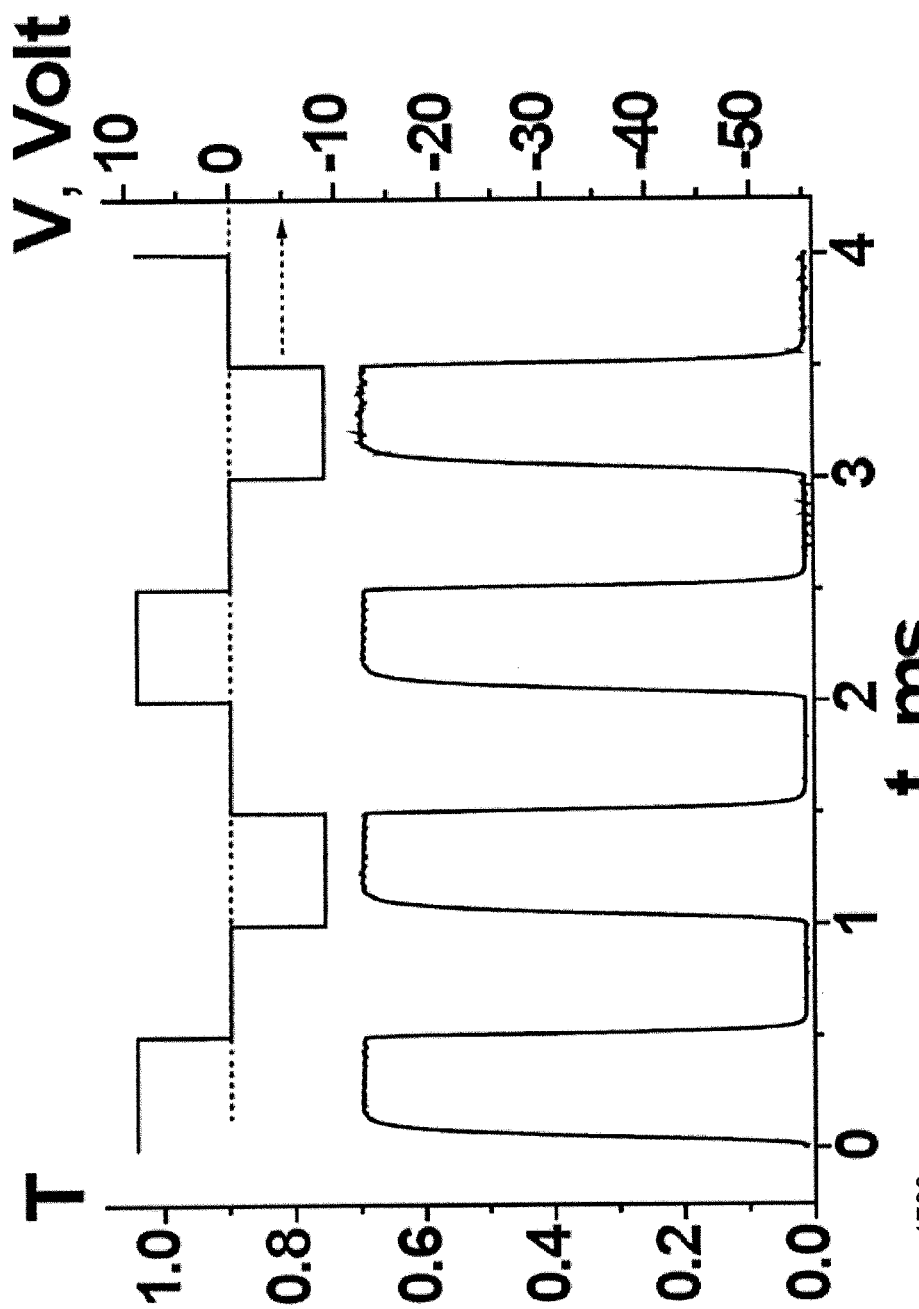
FIG. 17 is a graph showing a driving voltage waveform (top) applied to a liquid crystal cell according to one embodiment and the corresponding electro-optical response of the cell (bottom)
Figure 18:
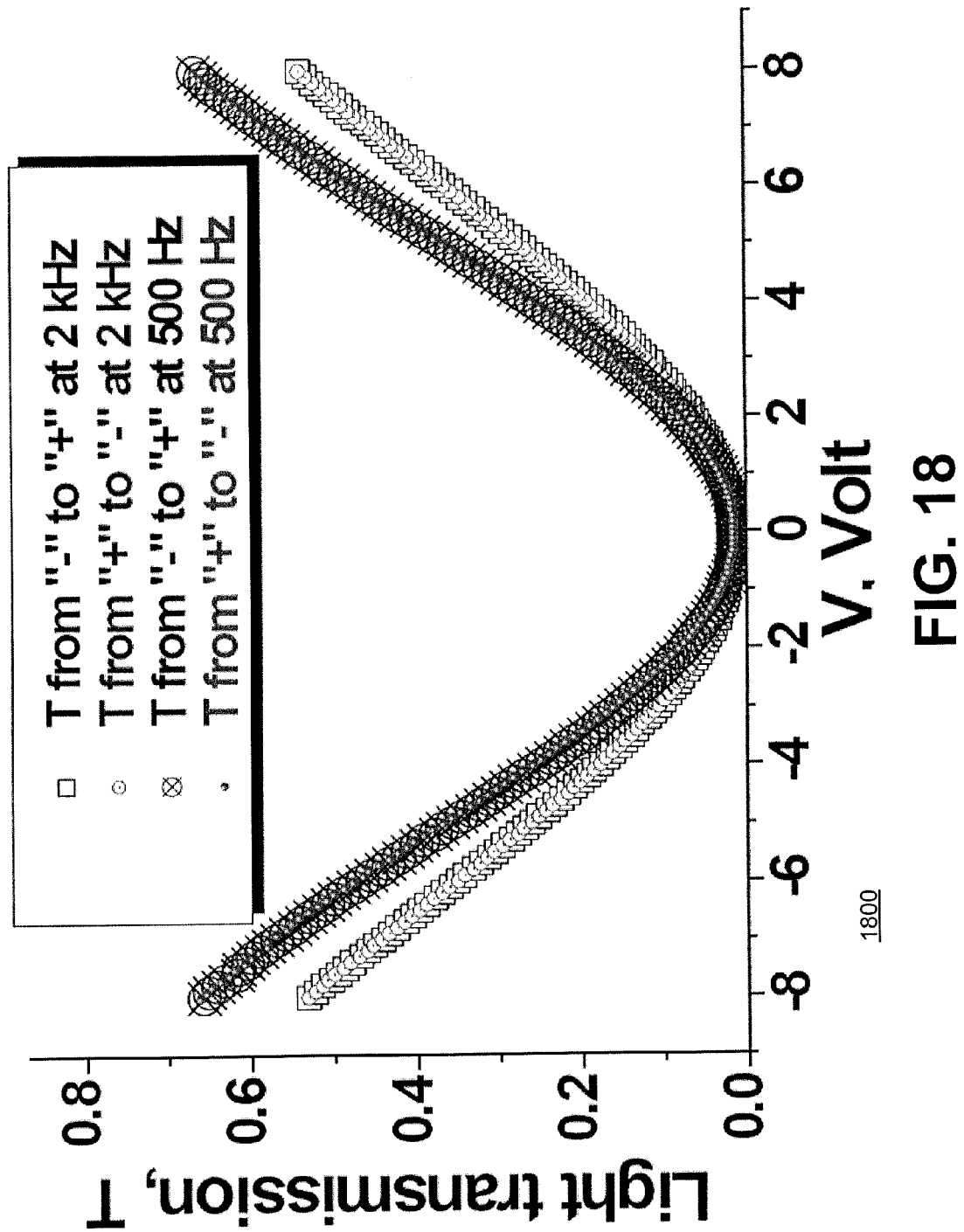
FIG. 18 is a graph showing the V-shaped mode of a cell according to one embodiment in the envelope curve of light transmission saturation states, with symmetric rectangular alternative sign driving voltage pulses at a electro-optical response frequencies of 500 Hz and 2 kHz.

In the second mode, when β=0 or π/2, the electro-optical response is insensitive to the driving voltage polarity, similar to NLC cells, but the response time is two orders faster than NLCs, with $\tau_{0.1-0.9}^{on}\cong 80$ μs and $\tau_{0.1-0.9}^{off}\cong 60$ μs. Graph 1700 of FIG. 17 depicts the relationship between the applied driving voltage (top waveform, right y-axis) with the electro-optical response (bottom waveform, left y-axis) of an FLC-587 based cell with $d_{FLC}$=1.7 μm placed between crossed polarizers at β=0. The electro-optical response frequency $f_{el}$ is two times higher than the driving voltage frequency $f_{av}$. Graph 1800 of FIG. 18 depicts the V-shaped mode in the saturation levels of light transmission levels measured based on the rectangular alternating voltage of FIG. 17 at response frequencies of $f_{el}$=2 kHz and 500 Hz (with T being evaluated relative to the transmission of an empty cell placed between parallel polarizers being T=1). As seen in FIG. 18, the response exhibits a perfect V-shaped mode in the saturation levels of light transmission obtained for rectangular alternating applied voltage pulses. The driving voltage waveform shown in FIG. 17 creates conditions under which hysteresis cannot be observed, since the addressing of light transmission levels starts from the same non-deformed helix that formed at the zero voltage between two pulses of alternating signs. Thus, the V-shaped electro-optical response is a property of a DHF FLC based on the applied rectangular alternating electric field waveform, frequency, and the cell geometry.

Figure 19:
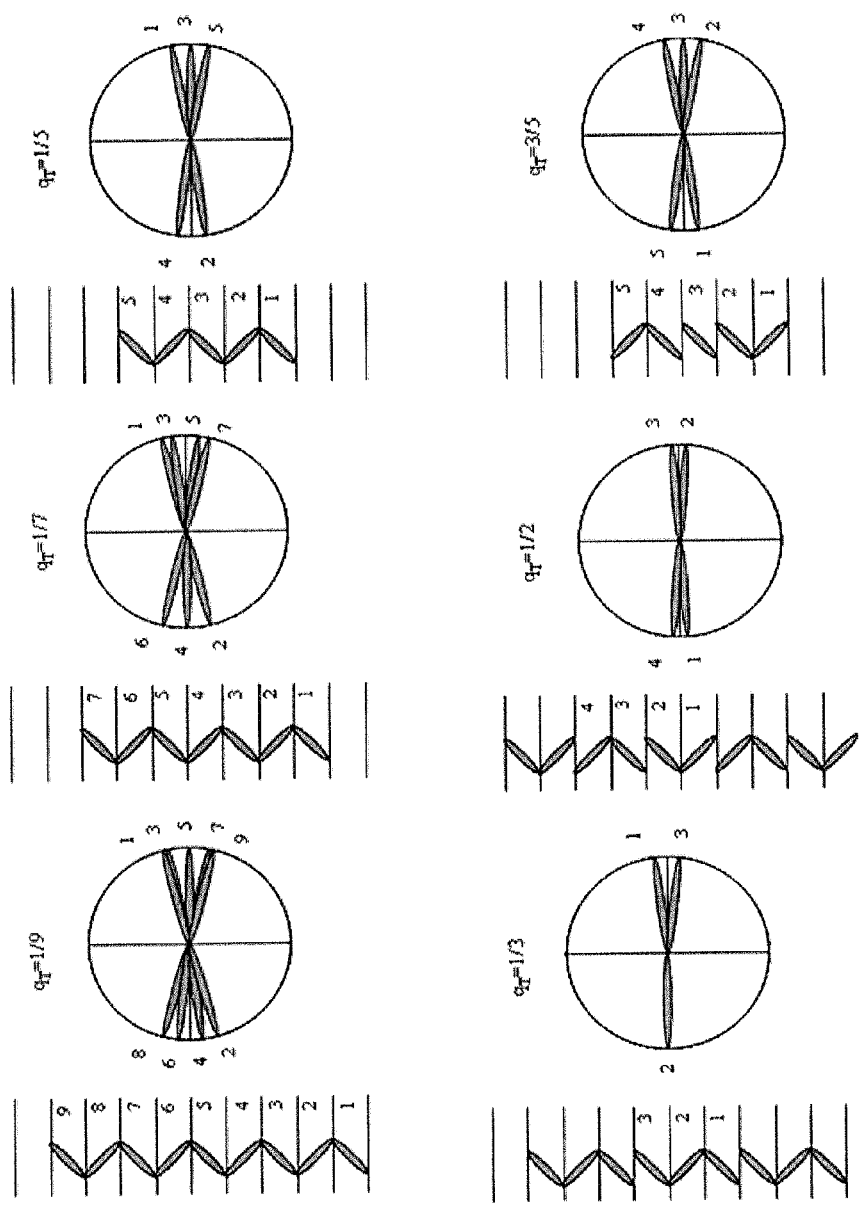
FIG. 19 is a diagram showing elementary cells of chiral smectic ferroelectric phases according to one embodiment, where $q_T$ indicates a rate of smectic layers in elementary cell with the same sign (left/right) of deviation regarding the helix axes.

In yet another further embodiment, the chiral liquid crystal layer of a liquid crystal cell may be a ferrielectric liquid crystal of any possible chiral smectic phase with a helical structure having a pitch smaller than the gap between the first and the second substrates at any boundary conditions and at any applied driving voltage V less than the critical voltage $V_c$ of the helix unwinding. FIG. 19 depicts a diagram 1900 showing elementary cells of chiral smectic ferroelectric phases according to one embodiment, where $q_T$ indicates a rate of smectic layers in elementary cell with the same sign (left/right) of deviation regarding the helix axes. If the helix axes and the principle optical axes of the chiral ferrielectric liquid crystal layer sandwiched between a pair of substrates and placed between two crossed polarizer and analyzer are parallel or perpendicular to the polarizer plane (similar to what is shown above with β=0 or β=π/2 in FIG. 2), and AC rectangular voltage pulses of amplitude V<$V_c$ are applied to the liquid crystal then, first, the electro-optical response is not sensitive to the driving voltage polarity and second, the cells exhibit perfect high frequency (over 1 kHz) V-shaped mode (similar to the graph shown in FIG. 8) in the envelope curve of light transmission saturation states, upon application of symmetric rectangular alternative sign driving voltage pulses (similar to the waveform shown at the top of the graph in FIG. 6).

Figure 20:
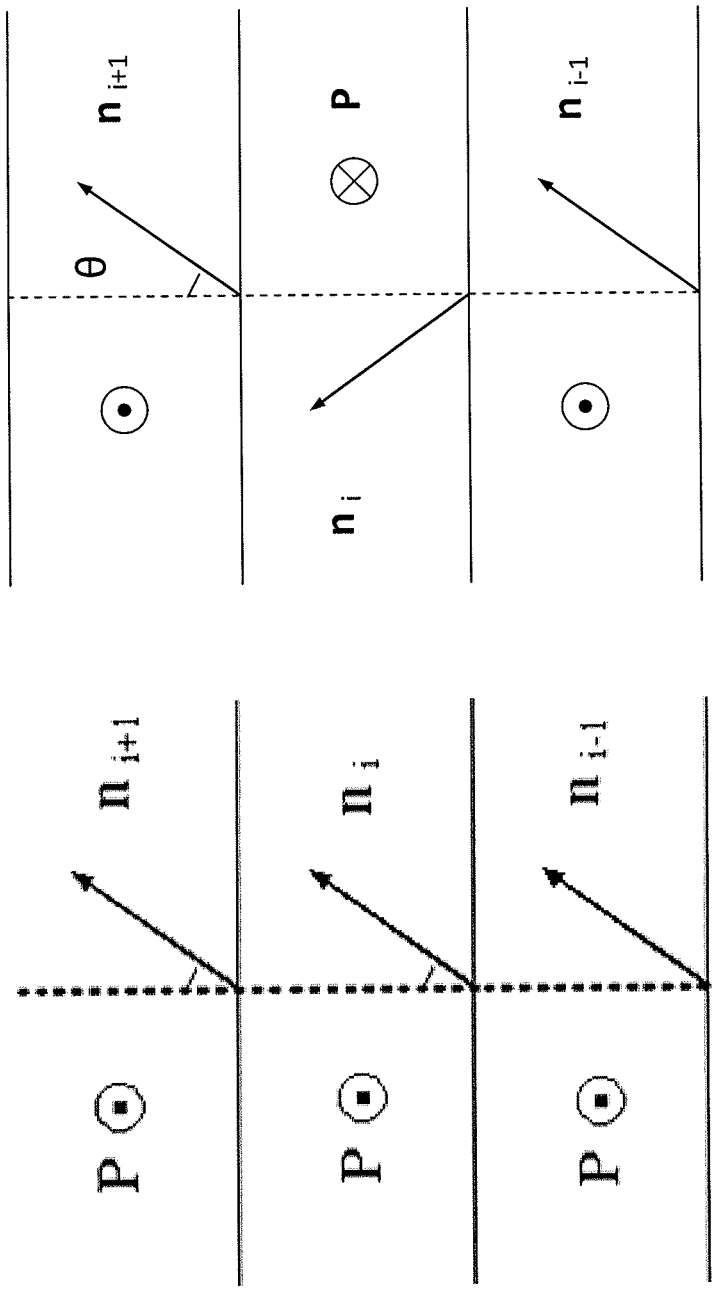
FIG. 20 is a diagram comparing chiral smectic antiferroelectric $C_{A^*}$ phase in comparison with chiral C* phase (left) according to one embodiment, where P is the spontaneous polarization vector.

In yet another further embodiment, the chiral liquid crystal layer of a liquid crystal cell may be an antiferroelectric liquid crystal of chiral smectic $C_{A^*}$ phase with a helical structure having a pitch smaller than the gap between the first and the second substrates at any boundary conditions and at any applied driving voltage V less than the critical voltage $V_c$ of the helix unwinding. FIG. 20 depicts a diagram 2000 comparing chiral smectic antiferroelectric $C_{A^*}$ phase in comparison with chiral C* phase (left) according to one embodiment, where P is the spontaneous polarization vector. If the helix axes and the principle optical axes of the chiral smectic $C_{A^*}$ phase layer sandwiched between a pair of substrates and placed between two crossed polarizer and analyzer are parallel or perpendicular to the polarizer plane (similar to what is shown above with $\beta=0$ or $\beta=\pi/2$ in FIG. 2), and AC rectangular voltage pulses of amplitude $V<V_c$ are applied to the liquid crystal then, first, the electro-optical response is not sensitive to the driving voltage polarity and second, the cells exhibit perfect high frequency (over 1 kHz) V-shaped mode (similar to the graph shown in FIG. 8) in the envelope curve of light transmission saturation states, upon application of symmetric rectangular alternative sign driving voltage pulses (similar to the waveform shown at the top of the graph in FIG. 6).

It will thus be appreciated that novel photo-aligned DHF-FLC, DHF ferrielectric liquid crystal, and DHF antiferroelectric liquid crystal devices may be produced using the embodiments described herein, the applications of which include an FSC FLC with high resolution, low power consumption, and extended color gamut—usable in screens for portable PCs mobile phones, PDAs, FSC FLC microdisplays, etc.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Appendix I

Pozhidaev et al., "New Chiral Dopant Possessing High Twisting Power," Mol. Cryst. Liq. Cryst., 509, 1042-1050 (2009) [Excerpts reproduced here with formatting changes to comply with Patent Office requirements].

Introduction

The most appropriate and cheep [sic] method to obtain ferroelectric liquid crystal (FLC) multicomponent composition with desirable properties is to admix a chiral dopant or a composition of the dopants into an achiral smectic C matrix [1,2]. This method allows to simplify the problem of FLC's creation by dividing it into two stages: the first stage is elaboration of the achiral matrix possessing required properties such as phase sequence, a broad temperature range of smectic C phase, rotational viscosity $\gamma_\phi$, molecular tilt angle $\theta$, etc. The second one is a choice of the chiral dopant providing an intended magnitude of the spontaneous polarization $P_s$ and a proper helical pitch $p_0$, depending on the type of the used electro-optical effect.

The structure of a chiral dopant should be chosen so, that its introduction into a smectic C matrix would not considerably change the matrix fundamental parameters, especially the temperature range of smectic C phase. One of the most appropriate chemical class in this sense are derivatives of p-terphenyl-dicarboxylic acid [3-5], which even being non-mesogenic can enlarge the temperature range of C* phase of the mixtures, when they are added to achiral smectic C matrix.

Chiral derivatives of p-terphenyl-dicarboxylic acid possess rather high helical twisting power both in nematic and smectic C* phases [3]. That was the reason why due to these chiral dopants the helical pitch of the smectic C* phase less than 1 μm was observed for the first time. Moreover, electro-optical mode of deformed helix ferroelectric (DHF) liquid crystal was recognized as a very suitable operation mode of low voltage and fast switching (the response time is less than 200 ms) liquid crystalline light shutters [6].

All FLC mixtures, elaborated before for applications with DHF-effect, have the helical pitch, which provides the selective light reflection in the visible spectral range, so, the helical pitch, obviously, was more than 400 nm. That was a reason why the light scattering accompanied the electro-optical response of the DHF cells placed between two crossed polarizers [7]. The contrast ratio of the light shutters was restricted by this light scattering, therefore a shift of the $p_0$ magnitude down to the UV spectral range is desirable to improve the optical quality of the DHF cells via suppression of the light scattering.

This paper is concerning with the synthesis and investigation of a new chiral dopant that belongs to the derivatives of terphenyldicarboxylic acid also but has twisting power much higher than any of chiral compound of this series [3-5] known before.

Syntheses

Figure 21:
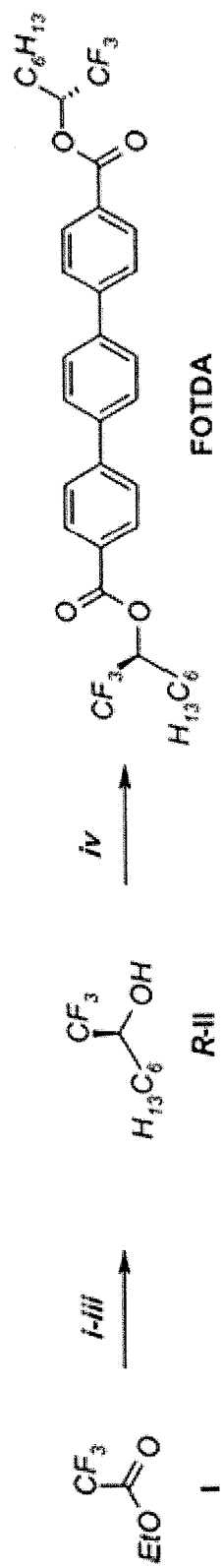
FIG. 21 depicts FIG. 1 from the Appendix I article.

The chemical structure of the new dopant (R,R)-bis-(1,1,1-trifluorooct-2-yl)-4,400-terphenyldicarboxylate (FOTDA) is shown [in FIG. 21 herein].

Figure 1:
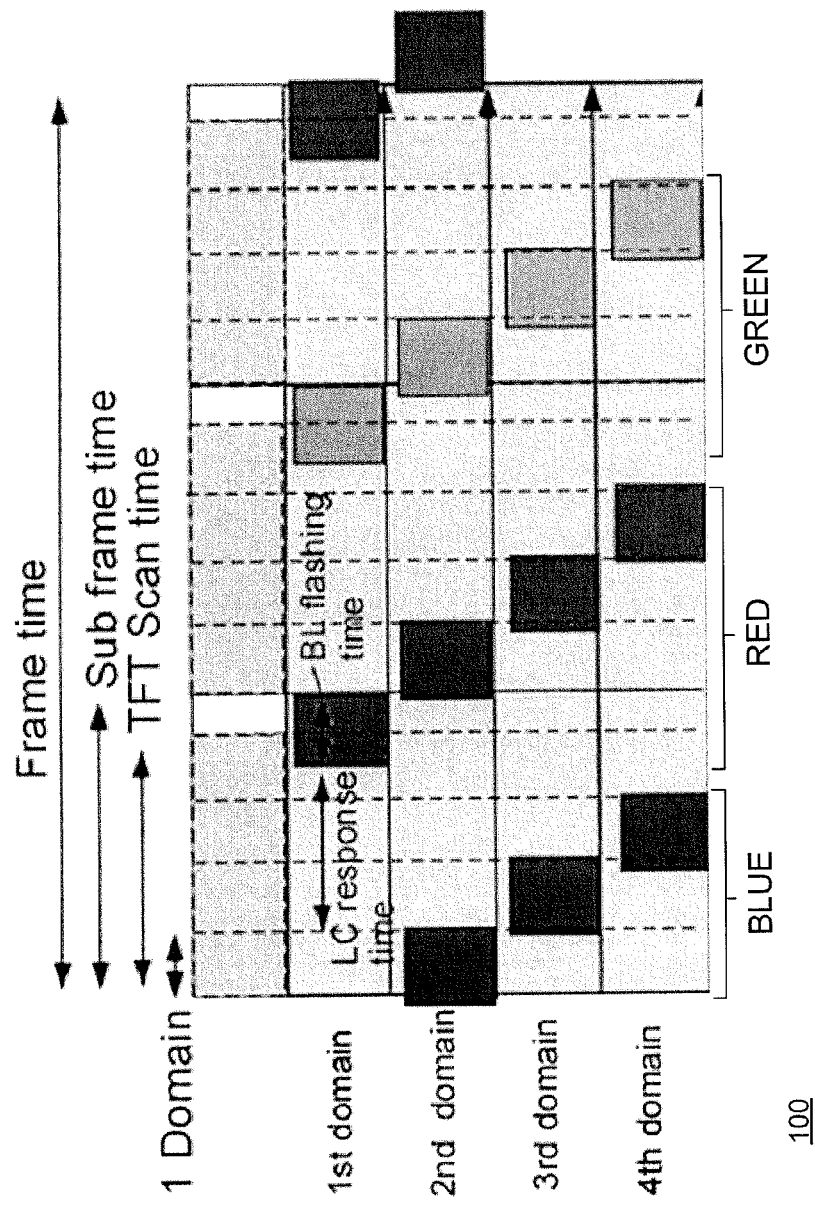
FIG. 1 is a diagram illustrating a successive additive color mixing process where separate colors are combined sequentially.

Synthesis of this dopant is accomplished as depicted in FIG. 1 [see FIG. 21 herein].

FIG. 1 [FIG. 21 herein] Scheme of FOTDA synthesis, where i: $C_6H_{13}MgBr$, $Et_2O$, reflux 4 h; chloroacetyl chloride, pyridine, $Et_2O$/benzene; iii: lipase from *Candida rugosa*, phosphate buffer pH 7.28, 38° C., 12 h; iv: 4,4"-terphenyl dicarboxylic acid dichloranhydride, pyridine/toluene, reflux.S)-1,1,1-trifluorooctan-2-ol (S-II) was obtained by three-stage synthesis starting from ethyl trifluoroacetate (I). I was subjected to one-pot Grignard addition/reduction sequence which results in formation of racemic alcohol (II) [8]. Optically active S-II was obtained in 36% yield (>98% ee) by enzymatic kinetic resolution of chloroacetic ester of racemic-II similarly to the method described in the work [7]. Reaction of S-II and 4,4"-terphenyl dicarboxylic acid dichloride gives target compound FOTDA (III) in 23% yield.

Materials

Ethyl trifluoroacetate, p-terphenyl, bromohexane, magnesium fillings, chloroacetyl chloride, NaOH, $KH_2PO_4$, silica gel 0.035-0.070 mm (Acros), Lipase from *Candida rugosa*, type VII (Sigma) and all used solvents and acids are commercially available. All solvents were distilled and dried (if required) before the use. n-Hexylmagnesium bromide was obtained as described in [8]. 4,4"-Terphenyldicarboxylic acid dichloride was obtained from p-terphenyl according [10]. The ee of (R)-1,1,1-trifluorooctan-2-ol was estimated by comparison of optical rotation for the obtained sample $[\alpha]_D^{15}$+28.3 (c=2.34 $CHCl_3$) with lit. data $[\alpha]_D^{26}$+26.3 (c=1.04 $CHCl_3$) [11].

(R,R)-bis-(1,1,1-trifluorooct-2-yl)-4,4"-terphenyldicarboxylate (FOTDA). The solution of (R)-1,1,1-trifluorooctan-2-nol (2.9 g, 15.7 mmol) in 100 ml of toluene was added dropwise to the refluxed solution of 4,4"-terphenyldicarboxylic acid dichloranhydride, (2.13 g, 6.7 mmol) in 150 ml of dry toluene followed by addition of dry pyridine (20 ml). The reaction mixture was refluxed overnight and then concentrated in vacuum. The residue was flash-chromatographed on silica gel in hexane as eluent; fractions containing the desired product were concentrated in vacuum giving crude FOTDA as maize yellow oil which contains essential amount of impurities according to HPLC. Further purification by preparative HPLC followed by extraction with hot hexane via short plug of silica gel in the modified Soxlet apparatus, and low-temperature crystallization from MeOH gives FOTDA as white crystals in 23% yield.

Purity >99% (HPLC).

NMR $^1H(CDCl_3, \delta$, ppm, J/Hz): 8.17 (4H, d, 8.2 Hz), 7.74 (4H, d, 8.2 Hz), 7.74 (4H, s), 5.57 (2H, sext., 6.6 Hz), 1.90 (4H, d, 7.1 Hz), 1.33 (16H, m), 0.86 (6H, t, 6.3 Hz);

MS (m/z ($I_{rel}$, %): 652 (6.9), 651 (37.1), 650 (100.0, M$^+$), 486 (3.8), 485 (18.2), 484 (34.6), 468 (12.6), 467 (45.1), 439 (5.0), 319 (18.7), 318 (74.1), 301 (21.5), 229 (13.3), 228 (34.8), 227 (14.8), 226 (17.6), 202 (6.0).

Melting point of compound FOTDA detected by microscope is 42.2° C.

Melting point of compound FOTDA detected via DCS is 42.12° C., melting heat is 3.9 kcal/M.

Results and Discussion

It is known that in a mixture of nematic liquid crystals with a low concentration of a chiral dopant the helix wave vector $q_0$ is expressed by the following equation [3]:

$$q_0 = 2\pi/p_0 = \lambda_0 C_{ch} \qquad (2) \text{ [Eq. (8) herein]}$$

where $\lambda_0$ is the twisting power of the mixture, $p_0$ is the helical pitch, $C_{ch}$ is weight concentration of the dopant. We have found experimentally that $q_0(C_{ch})$ dependence of the binary mixture of 5CB with the dopant FOTDA can be described by the relationship (2) [Eq. (8) herein] at $\lambda_0 \cong +0.4 \cdot 10^6$ (m·wt %)$^{-1}$.

Figure 22:
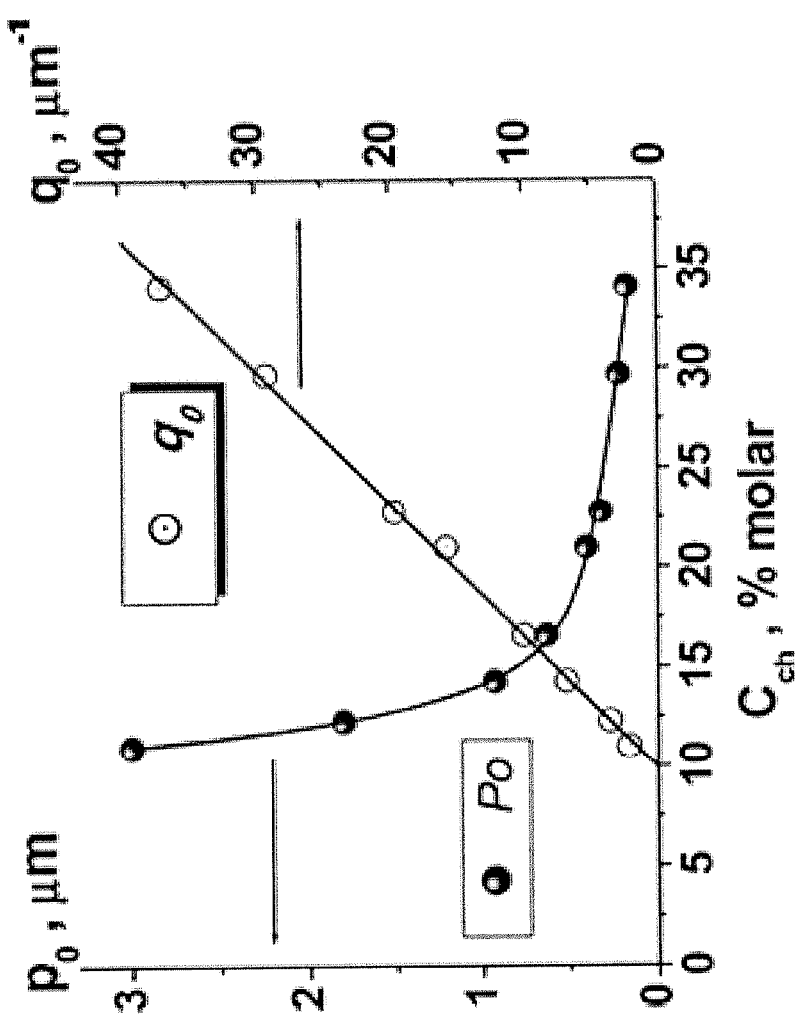
FIG. 22 depicts FIG. 4 from the Appendix I article.

A dependence of the helical pitch $p_0$ on molar concentration $C_{chm}$ of the chiral dopant FODTA $p_0(C_{chm})$ in its mixtures with the specially developed achiral smectic C multicomponent matrix has been measured as well (see FIG. 4) [see FIG. 22 herein]. Evidently, $q_0(C_{chm})$ dependence (FIG. 4) [see FIG. 22 herein] exhibits a threshold in smectic C* phase. Similar behavior of the helical pitch was already reported before [12,13].

That means the equation (2) [Eq. (8) herein] is not valid for smectic C* phase and origin of this fundamental phenomenon is still not clear. Analytical expression for $q_0(C_{chm})$ dependence in smectic C* phase can be written as:

$$q_0 = \frac{\lambda_{0m}}{2}[(C_{chm} - C_{chm}^{th}) + |C_{chm} - C_{chm}^{th}|], \qquad (3)\text{[Eq. (9) herein]}$$

where $C_{chm}^{th}$—is the threshold concentration, $\lambda_{0m}$ is the twisting power regarding the molar concentration of the chiral dopant. The experimental dependence $q_0(C_{chm})$ presented in FIG. 4 [FIG. 22 herein] can be described with the relationship (3) [Eq. (9) herein] at $\lambda_{0m} \cong +1.5 \cdot 10^6$ (m·mol %)$^{-1}$. So, the twisting power is very high in comparison with any one reported before in smectic C* phase, see, for instance [3].

FIG. 4 [FIG. 22 herein] Dependencies of the helical pitch and the wave vector on molar concentration of FOTDA in mixtures with the achiral smectic C multicomponent matrix. Measurements were carried out at temperature interval from A*-C* phase transition $(T_c - T) = 35°$ C.

REFERENCES

[1] Kuczynski, W. & Stegemeyer, H. (1980). *Chem. Phys. Lett.*, 70, 123.

[2] Beresnev, L. A., Blinov, L. M., Baikalov, V. A., Pozhidaev, E. P., Pavluchenko, A. I., & Purvanetskas, G. V. (1982). *Mol. Cryst. Liq. Cryst.*, 89, 327.

[3] Loseva, M., Chernova, N., Rabinovich, A., Pozhidaev, E., Narkevich, J., Petrashevich, O., Kazachkov, E., & Korotkova, N. (1991). *Ferroelectrics*, 114, 357.

[4] Chernova, N. I., Loseva, M. V., Pozhidaev, E. P., & Korotkova, N. I. (1993). *Ferroelectrics*, 138, 95.

[5] Haase, W., Ganzke, D., Pozhidaev, E. P., Ozaki, M., Matsui, T., Nakajama, K., & Joshino, K. (2000). *J. Soc. Mat. Eng.*, 9, N° 2, 95.

[6] Beresnev, L. A., Chigrinov, V. G., Dergachev, D. I., Pozhidaev, E. P., Funfshilling, J., & Shadt, M. (1989). *Liquid Crystals*, 5, N° 4, 1171.

[7] Haase, W., Ganzke, D., & Pozhidaev, E. P. (1999). *Mat. Res. Soc. Symp. Proc.*, 599, 15.

[8] Cambell, K. N., Knopbloch, J. O., & Cambell, B. K. (1950). *J. Am. Chem. Soc.*, 72, 4380.

[9] Xiao, L., Yamazaki, T., Kitazume, T., Yonezawa, T., Sakamoto, Y., & Nogawa, K. (1997). *J. Fluorine Chem.*, 84, 19.

[10] Cambell, T. W. (1960). J. Am. Chem. Soc., 82, 3126.

[11] Kuroki, Y., Sakamaki, Y., & Iseki, K. (2001). *Organic Letters*, 3, 457.

[12] Stegemeyer, H., Kersting, H. J., & Kuczynski, W. (1987). *Ber. Bunsenges. Phys. Chem.*, 91, 3.

[13] Kuczynski, W. (1988). *Ferroelectrics*, 84, 73.

The invention claimed is:

1. A liquid crystal display cell with fast response and continuous gray scale, comprising:

a chiral smectic liquid crystal layer positioned between two substrates, the liquid crystal layer comprising helix structures having helix pitch that is less than the thickness of the liquid crystal layer;

at least one polarizer positioned outside of the substrates; and a voltage source, configured to apply a driving voltage to the liquid crystal display cell, wherein amplitude of the driving voltage is less than critical voltage amplitude for helix unwinding of the helix structures of the liquid crystal layer;

wherein a principal optical axis of the liquid crystal layer coincides with helical axes of the helix structures of the liquid crystal layer at a steady state without application of the driving voltage, and wherein the helical axes deviated from the principal optical axis under application of the driving voltage so as to achieve the continuous grayscale.

2. The liquid crystal display cell of claim 1, wherein the liquid crystal display cell is part of a field sequential color (FSC) liquid crystal display.

3. The liquid crystal display cell of claim 2, wherein the field sequential color display device comprises a source of R (red), G (green) and B (blue) colors of illuminating lights applied to pixels sequentially in time, wherein the source comprises light emitting diodes.

4. The liquid crystal display cell of claim 1, where the driving voltage is formed by a thin-film transistor (TFT) matrix.

5. The liquid crystal display cell of claim 1, wherein the chiral smectic liquid crystal layer is a ferroelectric liquid crystal layer of chiral smectic C* phase with helical structure has a pitch smaller than the thickness of the liquid crystal layer.

6. The liquid crystal display cell of claim 1, where the chiral smectic liquid crystal layer is a ferrielectric liquid crystal of any chiral smectic phase with helical structure having a pitch smaller than a thickness of the liquid crystal layer.

7. The liquid crystal display cell of claim 1, where the chiral smectic liquid crystal layer is an antiferroelectric liquid crystal of chiral smectic CA* phase with helical structure having a pitch smaller than a gap between the first and the second substrates.

8. The liquid crystal display cell of claim 1, where the substrates are made of glass or plastic and covered with indium thin oxide (ITO) layers.

9. The liquid crystal display cell of claim 1, wherein the liquid crystal cell further comprises at least one aligning layer, wherein the at least one aligning layer is of the group consisting of: a photo-alignment layer, a rubbed polyimide layer, and an aligning layer formed by oblique evaporation.

10. The liquid crystal display cell of claim 1, wherein the liquid crystal cell comprises two polarizers, wherein the two polarizers are crossed.

11. The liquid crystal display cell of claim 1, wherein the liquid crystal cell is reflective and comprises a polarizer.

12. The liquid crystal display cell of claim 1, wherein the driving voltage comprises voltage pulses.

13. The liquid crystal display cell of claim 1, wherein the driving voltage comprises symmetric rectangular alternative sign voltage pulses.

* * * * *